United States Patent
Schardt et al.

(10) Patent No.: US 10,936,043 B2
(45) Date of Patent: Mar. 2, 2021

(54) THERMAL MANAGEMENT OF HARDWARE ACCELERATORS

(71) Applicant: International Business Machines Corporation, Armonk, NY (US)

(72) Inventors: Paul E. Schardt, Rochester, MN (US); Jim C. Chen, Rochester, MN (US); Lance G. Thompson, Rochester, MN (US); James E. Carey, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 209 days.

(21) Appl. No.: 15/964,213

(22) Filed: Apr. 27, 2018

(65) Prior Publication Data

US 2019/0332163 A1    Oct. 31, 2019

(51) Int. Cl.
| | | |
|---|---|---|
| G06F 1/3234 | (2019.01) | |
| G06F 1/3225 | (2019.01) | |
| G06F 11/30 | (2006.01) | |
| G06F 8/30 | (2018.01) | |
| G06F 9/448 | (2018.01) | |

(52) U.S. Cl.
CPC .......... *G06F 1/3275* (2013.01); *G06F 1/3225* (2013.01); *G06F 8/30* (2013.01); *G06F 9/449* (2018.02); *G06F 11/3058* (2013.01)

(58) Field of Classification Search
None
See application file for complete search history.

(56) References Cited

U.S. PATENT DOCUMENTS

| | | | |
|---|---|---|---|
| 5,639,163 A | 6/1997 | Davidson et al. | |
| 8,230,374 B2 | 7/2012 | McCubbrey | |
| 9,298,438 B2 | 3/2016 | Nightingale et al. | |
| 9,424,019 B2 | 8/2016 | Nightingale et al. | |
| 2008/0148227 A1* | 6/2008 | McCubbrey | G06F 17/5054 717/110 |
| 2013/0346669 A1* | 12/2013 | Nightingale | G06F 8/65 711/103 |
| 2014/0380025 A1* | 12/2014 | Kruglick | G06F 9/30007 712/220 |
| 2019/0043737 A1* | 2/2019 | Hutton | B60H 1/00271 |

OTHER PUBLICATIONS

OpenCAPI Consortium; "OpenCAPI Overview". Oct. 14, 2016. Accessed from https://opencapi.org/wp-content/uploads/2016/09/OpenCAPI-Overview.10.14.16.pdf&hl=en_US on Jan. 14, 2020. (Year: 2016).*

\* cited by examiner

*Primary Examiner* — Kim Huynh
*Assistant Examiner* — Joshua Neveln
(74) *Attorney, Agent, or Firm* — Martin & Associates, LLC; Derek P. Martin

(57) ABSTRACT

A thermal manager manages programmable devices that include one or more accelerators. The thermal manager may be part of an accelerator manager that manages multiple accelerators in multiple programmable devices. The thermal manager monitors the temperature of a programmable device and casts out one or more accelerators when the temperature of the programmable device exceeds a threshold. Where there are multiple accelerator images that have different thermal effects for a given function the thermal manager may replace the cast out accelerator with another accelerator image for the same function that uses less power.

20 Claims, 27 Drawing Sheets

Accelerator Catalog 1000

| Name | Location | LRU | MRU | Error Rate | Dependencies | Capabilities | Latency | Other Characteristic(s) |
|------|----------|-----|-----|------------|--------------|--------------|---------|-------------------------|
| Acc1 | <path> | <time> | <time> | X/100 runs | Acc2 | FP Unit | 1.0 us | Includes NW connection |
| ... | ... | ... | ... | ... | ... | ... | ... | ... |
| AccN | <path> | <time> | <time> | Y/100 runs | None | Graphics | 500 ns | Affinity to Acc5 |

FIG. 10

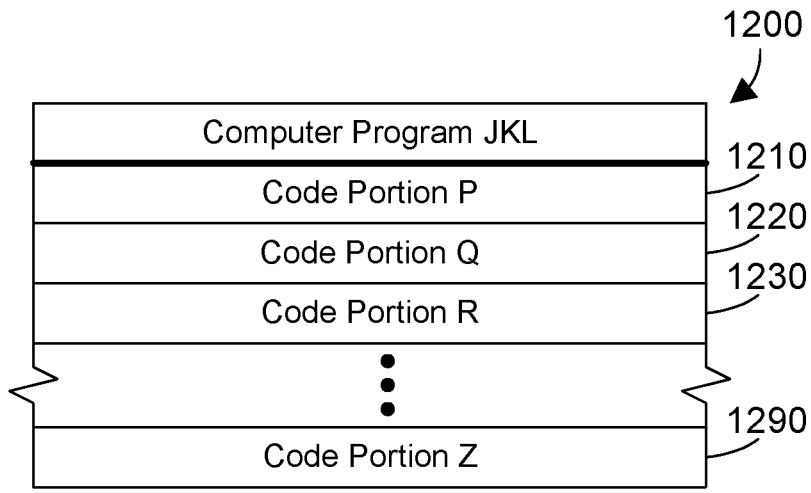
FIG. 12
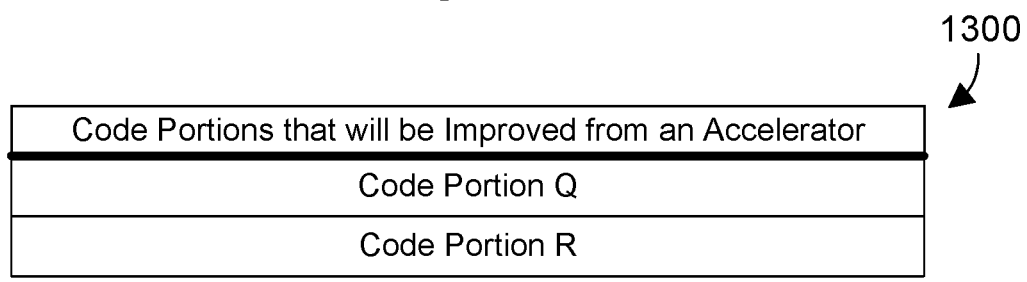
FIG. 13
| Accelerator Catalog | | | | | |
|---|---|---|---|---|---|
| Name | Location | LRU | MRU | Error Rate | Dependencies |
| AccQ | <path> | <time> | <time> | X/100 runs | None |
FIG. 14

Virtual Function Table — 2600

| Call From Computer Program | Call To |
|---|---|
| F1 | L1 |
| F2 | L2 |
| F3 | L3 |
| F4 | L4 |
| ⋮ | ⋮ |
| FN | LN |

Computer Program LMN
- 2720 — Code Portion D — Call F1
- 2722 — Code Portion E
- 2724 — Code Portion F — Call F4
- ⋮
- 2728 — Code Portion L — Call F2

FIG. 27

Accelerator Correlation Table — 2800

| Accelerator | Library Function |
|---|---|
| Acc1 | L4 |
| Acc2 | L1 |
| Acc3 | L2 |

FIG. 28

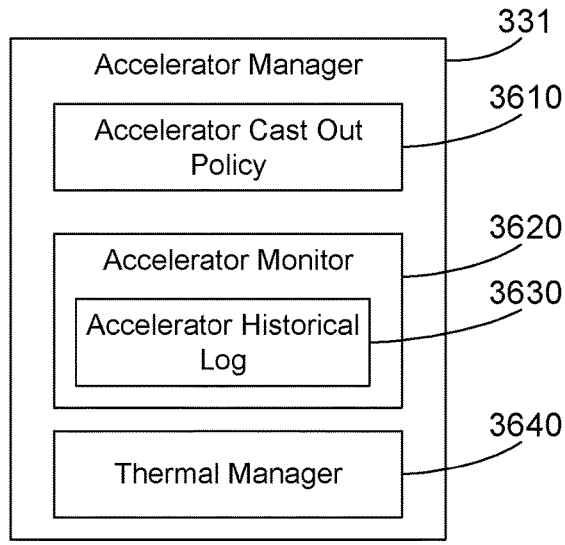
FIG. 36
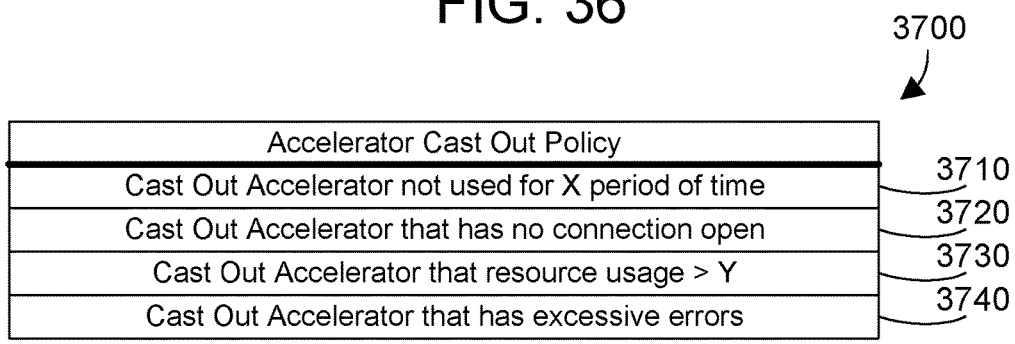
FIG. 37
| Accelerator Historical Log ||||||
|---|---|---|---|---|---|
| Name | Called By | Conn. Open | Resource Usage | Errors | Other |
| AccA | <AppList/Time> | <Y/N> | <number> | <ListOfErrors> | <data> |
| ⋮ | ⋮ | ⋮ | ⋮ | ⋮ | ⋮ |
| AccT | <AppList/Time> | <Y/N> | <number> | <ListOfErrors> | <data> |
FIG. 38

THERMAL MANAGEMENT OF HARDWARE ACCELERATORS

BACKGROUND

1. Technical Field

This disclosure generally relates to computer systems, and more specifically relates to thermal management of hardware accelerators in a computer system.

2. Background Art

The Open Coherent Accelerator Processor Interface (OpenCAPI) is a specification developed by a consortium of industry leaders. The OpenCAPI specification defines an interface that allows any processor to attach to coherent user-level accelerators and I/O devices. OpenCAPI provides a high bandwidth, low latency open interface design specification built to minimize the complexity of high-performance accelerator design. Capable of 25 gigabits (Gbits) per second per lane data rate, OpenCAPI outperforms the current peripheral component interconnect express (PCIe) specification which offers a maximum data transfer rate of 16 Gbits per second per lane. OpenCAPI provides a data-centric approach, putting the compute power closer to the data and removing inefficiencies in traditional system architectures to help eliminate system performance bottlenecks and improve system performance. A significant benefit of OpenCAPI is that virtual addresses for a processor can be shared and utilized in an OpenCAPI device, such as an accelerator, in the same manner as the processor. With the development of OpenCAPI, hardware accelerators may now be developed that include an OpenCAPI architected interface.

BRIEF SUMMARY

A thermal manager manages programmable devices that include one or more accelerators. The thermal manager may be part of an accelerator manager that manages multiple accelerators in multiple programmable devices. The thermal manager monitors the temperature of a programmable device and casts out one or more accelerators when the temperature of the programmable device exceeds a threshold. Where there are multiple accelerator images that have different thermal effects for a given function the thermal manager may replace the cast out accelerator with another accelerator image for the same function that uses less power.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and:

FIG. 10 is a block diagram showing a sample accelerator catalog;

FIG. 12 is a block diagram showing a second sample computer program with different code portions;

FIG. 13 is a block diagram identifying two code portions in the computer program in FIG. 12 that would benefit from an accelerator;

FIG. 14 is a block diagram showing a sample accelerator catalog that includes an accelerator that corresponds to code portion Q;

FIG. 26 shows a virtual function table that creates a level of indirection for calls from the computer program to the software library;

FIG. 27 is a block diagram of the computer program in FIG. 24 after the calls to the software library have been replaced with calls to the virtual function table;

FIG. 28 is a block diagram of an accelerator correlation table showing currently-implemented accelerators that correspond to functions in the software library;

FIG. 36 is a block diagram of the accelerator manager shown in FIG. 3;

FIG. 37 is a table showing suitable criteria in an accelerator cast out policy;

FIG. 38 is a table showing suitable criteria that could be included in an accelerator historical log;

DETAILED DESCRIPTION

Figure 1:
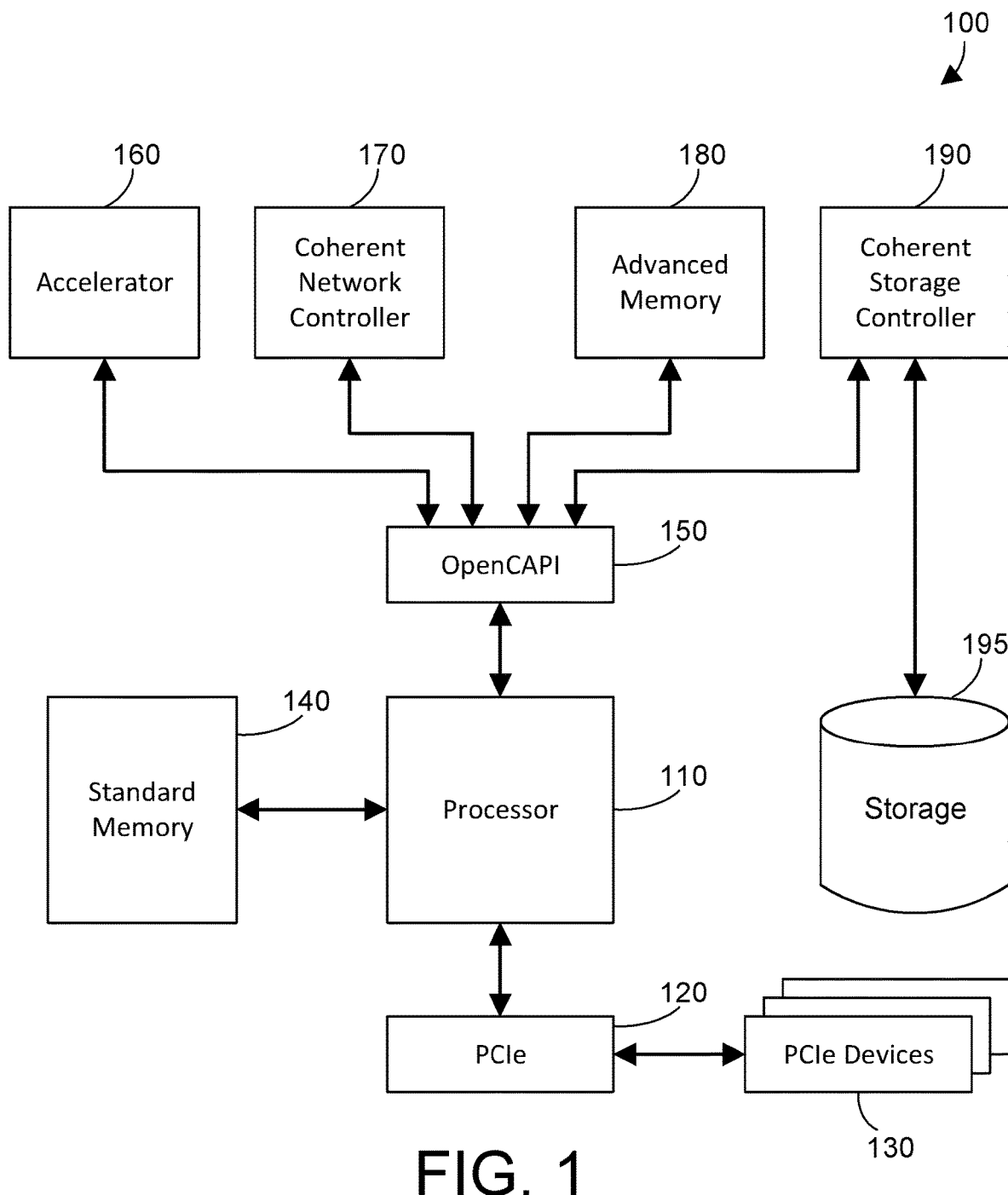
FIG. 1 is a block diagram of a sample system illustrating how an Open Coherent Accelerator Processor Interface (OpenCAPI) can be used.

As discussed in the Background Art section above, the Open Coherent Accelerator Processor Interface (OpenCAPI) is a specification that defines an interface that allows any processor to attach to coherent user-level accelerators and I/O devices. Referring to FIG. 1, a sample computer system 100 is shown to illustrate some of the concepts related to the OpenCAPI interface 150. A processor 110 is coupled to a standard memory 140 or memory hierarchy, as is known in the art. The processor is coupled via a PCIe interface 120 to one or more PCIe devices 130. The processor 110 is also coupled via an OpenCAPI interface 150 to one or more coherent devices, such as accelerator 160, coherent network controller 170, advanced memory 180, and coherent storage controller 190 that controls data stored in storage 195. While the OpenCAPI interface 150 is shown as a separate entity in FIG. 1 for purposes of illustration, instead of being a separate interface as shown in FIG. 1, the OpenCAPI interface 150 can be implemented within each of the coherent devices. Thus, accelerator 160 may have its own OpenCAPI interface, as may the other coherent devices 170, 180 and 190. One of the significant benefits of OpenCAPI is that virtual addresses for the processor 110 can be shared with coherent devices that are coupled to or include an OpenCAPI interface, permitting them to use the virtual addresses in the same manner as the processor 110.

Figure 2:
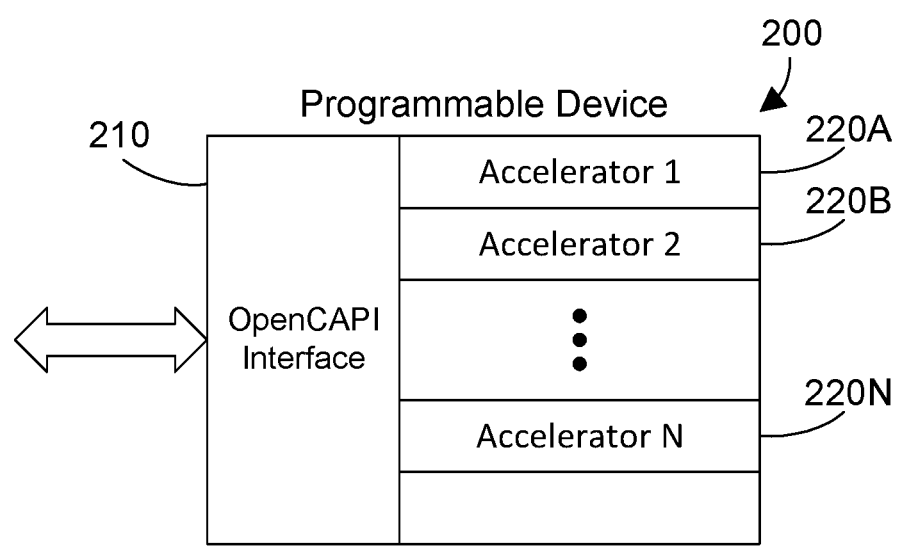
FIG. 2 is a flow diagram of a programmable device with an OpenCAPI interface that may include one or more hardware accelerators.

Referring to FIG. 2, a programmable device 200 represents any suitable programmable device. For example, the programmable device 200 could be an FPGA or an ASIC. An OpenCAPI interface 210 can be implemented within the programmable device. In addition, one or more accelerators can be implemented in the programmable device 200. FIG. 1 shows by way of example accelerator 1 220A, accelerator 2 220B, . . . , accelerator N 220N. In the prior art, a human designer would determine what type of accelerator is needed based on a function that needs to be accelerated by being implemented in hardware. The accelerator function could be represented, for example, in a hardware description language (HDL). Using known tools, the human designer can then generate an accelerator image that corresponds to the HDL. The accelerator image, once loaded into the programmable device such as 200 in FIG. 2, creates an accelerator in the programmable device that may be called as needed by one or more computer programs to provide the hardware accelerator(s).

A thermal manager manages programmable devices that include one or more accelerators. The thermal manager may be part of an accelerator manager that manages multiple accelerators in multiple programmable devices. The thermal manager monitors the temperature of a programmable device and casts out one or more accelerators when the temperature of the programmable device exceeds a threshold. Where there are multiple accelerator images that have different thermal effects for a given function the thermal manager may replace the cast out accelerator with another accelerator image for the same function that uses less power.

Figure 3:
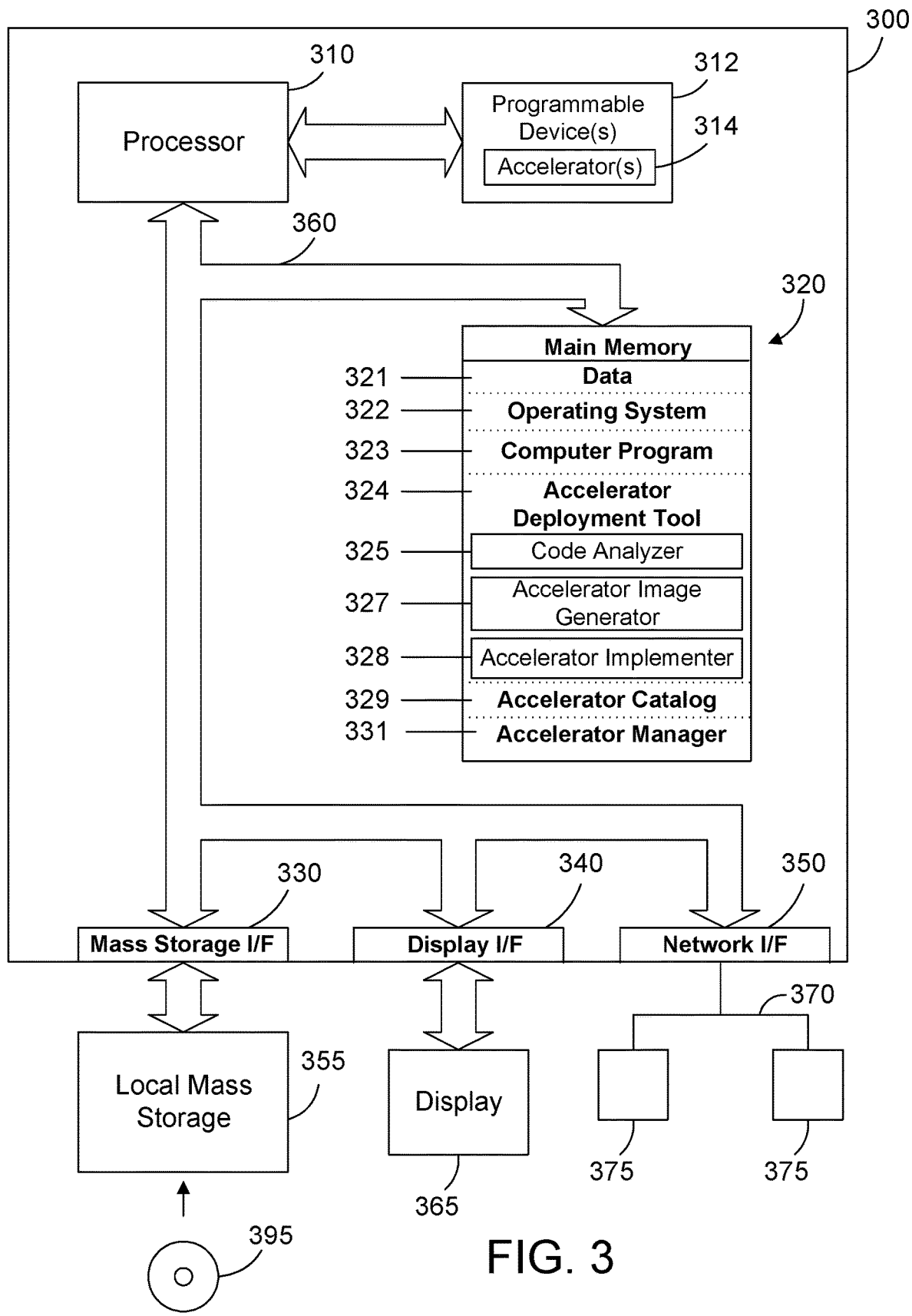
FIG. 3 is a block diagram of a computer system that includes a tool for managing accelerators.

Referring to FIG. 3, a computer system 300 is one suitable implementation of a computer system that includes an accelerator manager with a thermal manager as described in more detail below. Server computer system 300 is an IBM POWER9 computer system. However, those skilled in the art will appreciate that the disclosure herein applies equally to any computer system, regardless of whether the computer system is a complicated multi-user computing apparatus, a single user workstation, a laptop computer system, a tablet computer, a phone, or an embedded control system. As shown in FIG. 3, computer system 300 comprises one or more processors 310, one or more programmable devices 312, a main memory 320, a mass storage interface 330, a display interface 340, and a network interface 350. These system components are interconnected through the use of a system bus 360. Mass storage interface 330 is used to connect mass storage devices, such as local mass storage device 355, to computer system 300. One specific type of local mass storage device 355 is a readable and writable CD-RW drive, which may store data to and read data from a CD-RW 395. Another suitable type of local mass storage device 355 is a card reader that receives a removable memory card, such as an SD card, and performs reads and writes to the removable memory. Yet another suitable type of local mass storage device 355 is universal serial bus (USB) that reads a storage device such a thumb drive.

Main memory 320 preferably contains data 321, an operating system 322, a computer program 323, an accelerator deployment tool 324, an accelerator catalog 329, and an accelerator manager 331. Data 321 represents any data that serves as input to or output from any program in computer system 300. Operating system 322 is a multitasking operating system, such as AIX or LINUX. Computer program 323 represents any suitable computer program, including without limitations an application program, an operating system, firmware, a device driver, etc. The accelerator deployment tool 324 preferably includes a code analyzer 325, an accelerator image generator 327, and an accelerator implementer 328. The code analyzer 325 analyzes the computer program 324 as it runs to determine its run-time performance. One suitable way for code analyzer 325 to analyze the computer program is using known techniques for monitoring the run-time performance of a computer program. For example, tools exist in the art that allow real-time monitoring of the run-time performance of a computer program using a monitor external to the computer program that detects, for example, which addresses are being executed by the processor 310 during the execution of the computer program 323. Other tools known as profilers allow inserting instrumentation code into a computer program, which is code that increments different counters when different branches of the computer program are executed. The values of the counters can be analyzed to determine the frequency of executing each portion of the computer program. The code analyzer 325, after analyzing the run-time performance of the computer program, identifies a code portion, which is a portion of code in the computer program 323, that will be improved from being deployed to a hardware accelerator to enhance the run-time performance of the computer program 323.

The accelerator image generator 327 dynamically generates an accelerator image corresponding to the code portion in the computer program 323 identified by the code analyzer 325. The code portion in the computer program 323 is shown as code portion 326 in FIGS. 4 and 5. The accelerator image generator 327 may generate an accelerator image from the code portion using any suitable method. For example, the accelerator image generator 327 could generate an equivalent hardware description language (HDL) representation of the code portion, then synthesize the HDL representation into a suitable accelerator image for the programmable device 312. The accelerator implementer 328 preferably takes an accelerator image generated by the accelerator image generator 327, and uses the accelerator image to program the programmable device 312, thereby generating a hardware accelerator 314 in a programmable device 312 that corresponds to the code portion.

In a first implementation, the accelerator deployment tool 324 dynamically generates an accelerator image corresponding to the code portion of the computer program 323, then programs the programmable device with the accelerator image so the programmable device includes a hardware accelerator that corresponds to the code portion. In a second implementation, an accelerator catalog 329 is provided and maintained. The accelerator catalog 329 preferably includes a listing of previously-generated accelerators. In the second implementation, the accelerator deployment tool 324 first checks the accelerator catalog 329 to see if a previously-generated accelerator is available for the code portion. If so, the accelerator deployment tool 324 deploys a previously generated accelerator image identified in the accelerator catalog. If not, the accelerator deployment tool 324 dynamically generates an accelerator image as described above, then loads the image into a programmable device 312 to provide the accelerator 314 that corresponds to the code portion.

The accelerator manager 331 manages accelerators after they are running and being called by one or more computer programs, such as software applications. The accelerator manager 331 monitors usage of accelerators by computer programs, and determines when an accelerator should be cast out of a programmable device. The function of the accelerator manager is discussed in more detail below with respect to FIGS. 34-38.

Computer system 300 utilizes well known virtual addressing mechanisms that allow the programs of computer system 300 to behave as if they only have access to a large, contiguous address space instead of access to multiple, smaller storage entities such as main memory 320 and local mass storage device 355. Therefore, while data 321, operating system 322, computer program 323, accelerator deployment tool 324, accelerator catalog 329 and accelerator manager 331 are shown to reside in main memory 320, those skilled in the art will recognize that these items are not necessarily all completely contained in main memory 320 at the same time. It should also be noted that the term "memory" is used herein generically to refer to the entire virtual memory of computer system 300, and may include the virtual memory of other computer systems coupled to computer system 300.

Processor 310 may be constructed from one or more microprocessors and/or integrated circuits. Processor 310 could be, for example, one or more POWER9 microprocessors. Processor 310 executes program instructions stored in main memory 320. Main memory 320 stores programs and data that processor 310 may access. When computer system 300 starts up, processor 310 initially executes the program instructions that make up operating system 322. Processor 310 also executes the computer program 323, the accelerator deployment tool 324 and the accelerator manager 331.

Programmable device(s) 312 can be any suitable programmable logic device that can be dynamically programmed by the processor 310. Examples of known suitable programmable logic devices include field-programmable gate arrays (FPGAs). However, the programmable device 312 broadly includes any programmable logic device that allows the processor 310 to dynamically program the programmable device 312, including known technologies as well as technologies that are developed in the future.

Although computer system 300 is shown to contain only a single processor and a single system bus, those skilled in the art will appreciate that an accelerator manager as described herein may be practiced using a computer system that has multiple processors and/or multiple buses. In addition, the interfaces that are used preferably each include separate, fully programmed microprocessors that are used to off-load compute-intensive processing from processor 310. However, those skilled in the art will appreciate that these functions may be performed using I/O adapters as well.

Display interface 340 is used to directly connect one or more displays 365 to computer system 300. These displays 365, which may be non-intelligent (i.e., dumb) terminals or fully programmable workstations, are used to provide system administrators and users the ability to communicate with computer system 300. Note, however, that while display interface 340 is provided to support communication with one or more displays 365, computer system 300 does not necessarily require a display 365, because all needed interaction with users and other processes may occur via network interface 350.

Network interface 350 is used to connect computer system 300 to other computer systems or workstations 375 via network 370. Computer systems 375 represent computer systems that are connected to the computer system 300 via the network interface 350. Network interface 350 broadly represents any suitable way to interconnect electronic devices, regardless of whether the network 370 comprises present-day analog and/or digital techniques or via some networking mechanism of the future. Network interface 350 preferably includes a combination of hardware and software that allows communicating on the network 370. Software in the network interface 350 preferably includes a communication manager that manages communication with other computer systems 375 via network 370 using a suitable network protocol. Many different network protocols can be used to implement a network. These protocols are specialized computer programs that allow computers to communicate across a network. TCP/IP (Transmission Control Protocol/Internet Protocol) is an example of a suitable network protocol that may be used by the communication manager within the network interface 350. In one suitable implementation, the network interface 350 is a physical Ethernet adapter.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 4:
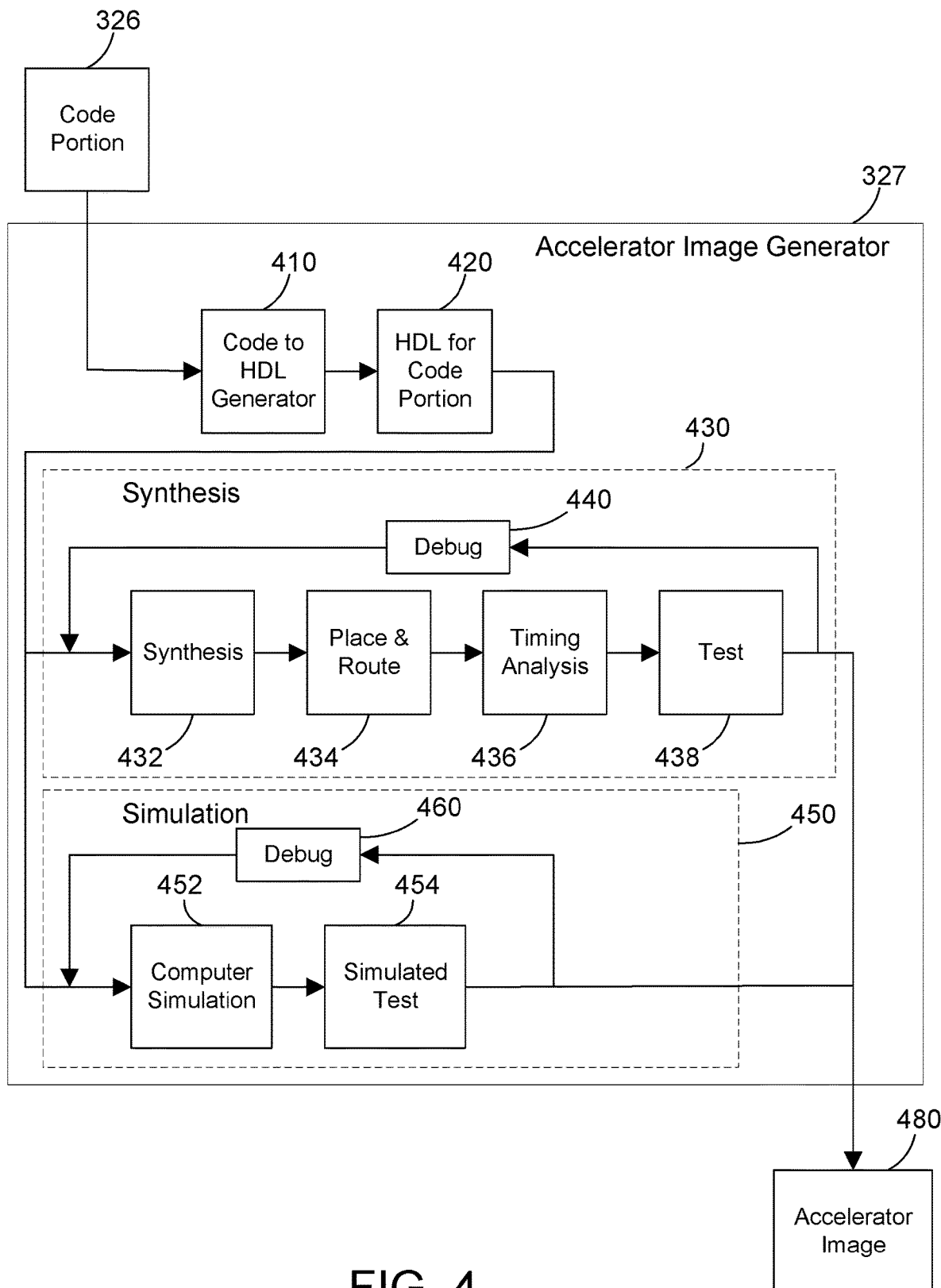
FIG. 4 is a flow diagram showing a specific implementation for how the accelerator image generator in FIG. 3 generates an accelerator image from a code portion.

FIG. 4 illustrates details of one suitable implementation of the accelerator image generator 327 shown in FIG. 3. The accelerator image generator 327 takes as input the code portion 326 shown in FIG. 4. A code to HDL generator 410 preferably converts the code portion 326 to a corresponding representation of the code portion in a hardware description language (HDL), shown in FIG. 4 as HDL for code portion 420. Known suitable hardware description languages include VHDL or Verilog, but any suitable hardware description language could be used. There are known software tools for generating an HDL representation of computer code. For example, Xilinx's Vivado High Level Synthesis is a software tool that converts code written in the C programming language to HDL. This type of tool is often referred to in the art as a "C to HDL" tool or a "C to RTL" tool, where RTL refers to the Register Transfer Level representation of a code portion needed to implement the code portion in hardware. The Code to HDL Generator 410 in FIG. 4 could be a known software tool, or could be a software tool specifically designed for the accelerator image generator 327.

The HDL for the code portion 420 is fed into one or more processes that may include both synthesis and simulation. The synthesis process 430 is shown in the middle portion of FIG. 4 in steps 432, 434, 436, 438 and 440. The simulation process 450 is shown in the lower portion of FIG. 4 in steps 452, 454 and 460. The HDL for code portion 420 may be fed into the synthesis block 432, which determines which hardware elements are needed. The place and route block 434 determines where on the programmable device to put the hardware elements, and how to route interconnections between those hardware elements. Timing analysis 436 analyzes the performance of the accelerator after the hardware elements have been placed and interconnections have been routed in block 434. Test block 438 runs tests on the resulting accelerator image to determine whether timing and performance parameters are satisfied. The test block 438 feeds back to debug block 440 when the design of the accelerator still needs improvement. This process may iterate several times.

The simulation process 450 takes in the HDL for the code portion 420, and performs a computer simulation to determine its functionality. A simulated test block 454 determines whether the simulated design functions as needed. The simulated test block 454 feeds back to a debug block 460 when the design of the accelerator still needs improvement.

The accelerator image generator 327 may include either the synthesis block 430, the simulation block 450, or both. In the most preferred implementation, the accelerator image generator 327 includes both the synthesis block 430 and the simulation block 450. The synthesis process can be very time-consuming. The simulation block is typically much faster in testing the design of the HDL than the synthesis block. When both synthesis 430 and simulation 450 are both present, the accelerator image generator can use both of these in any suitable way or combination. For example, the simulation block 450 could be used initially to iterate a few times on the design, and when the design is mostly complete, the mostly-completed design could be fed into the synthesis block 430. In another implementation, the synthesis and simulation blocks could function in parallel and cooperate until the generation of the accelerator image is complete. Regardless of the specific process used, the accelerator image generator 327 generates for the code portion 326 an accelerator image 480 that corresponds to the code portion 326. Once the accelerator image 480 has been generated, the accelerator implementer 328 in FIG. 3 can load the accelerator image 480 into a programmable device 312 to produce an accelerator 314 corresponding to the code portion 326. The accelerator 314 in the programmable device 312 may then be called by the computer program in place of the code portion 326.

Figure 5:
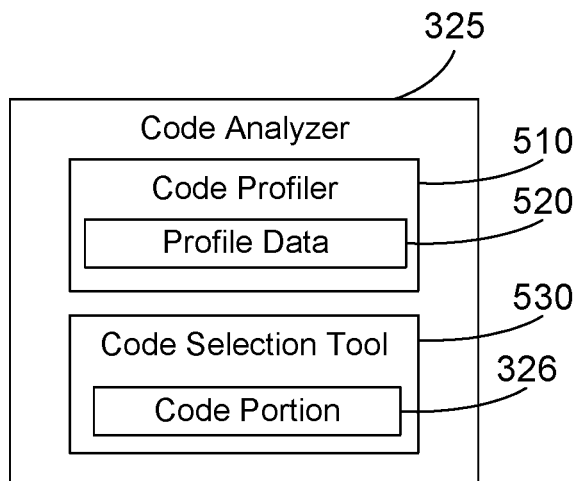
FIG. 5 is a block diagram of a specific implementation for the code analyzer in FIG. 3 that analyzes a computer program and selects a code portion.

Some details of one possible implementation for the code analyzer 325 in FIG. 3 are shown in FIG. 5. The code analyzer 325 can include a code profiler 510 that is used to profile the computer program. Profiling is done by the code profiler 510 preferably inserting instrumentation code into the computer program to generate profile data 520 as the computer program runs. The profile data 520 indicates many possible features of the computer program, including the frequency of executing different portions, the number or loop iterations, exceptions generated, data demand, bandwidth, time spent in a critical portion, etc. Software profilers are very well-known in the art, and are therefore not discussed in more detail here. For our purposes herein, suffice it to say the code profiler 510 generates profile data 520 that indicates run-time performance of the computer program being profiled.

The code analyzer 325 additionally includes a code selection tool 530 that identifies a code portion 326 that will be improved from being implemented in a hardware accelerator. Any suitable code portion could be identified according to any suitable criteria, algorithm or heuristic. For example, a portion of the code that performs floating-point calculations could be identified so that a corresponding floating-point accelerator could be generated to perform the floating-point calculations in the code. A portion of the code that performs a search of a database could be identified so a corresponding database search accelerator could be generated to replace the database search. A portion of the code that performs a specific function, such as data compression, XML parsing, packet snooping, financial risk calculations, etc., could also be identified. Of course, other code portions could be identified within the scope of the disclosure and claims herein. The code selection tool 530 can use any suitable criteria, algorithm or heuristic, whether currently known or developed in the future, to identify code portion 326. Once the code portion 326 in the computer program has been identified, a corresponding accelerator may be dynamically generated.

Figure 6:
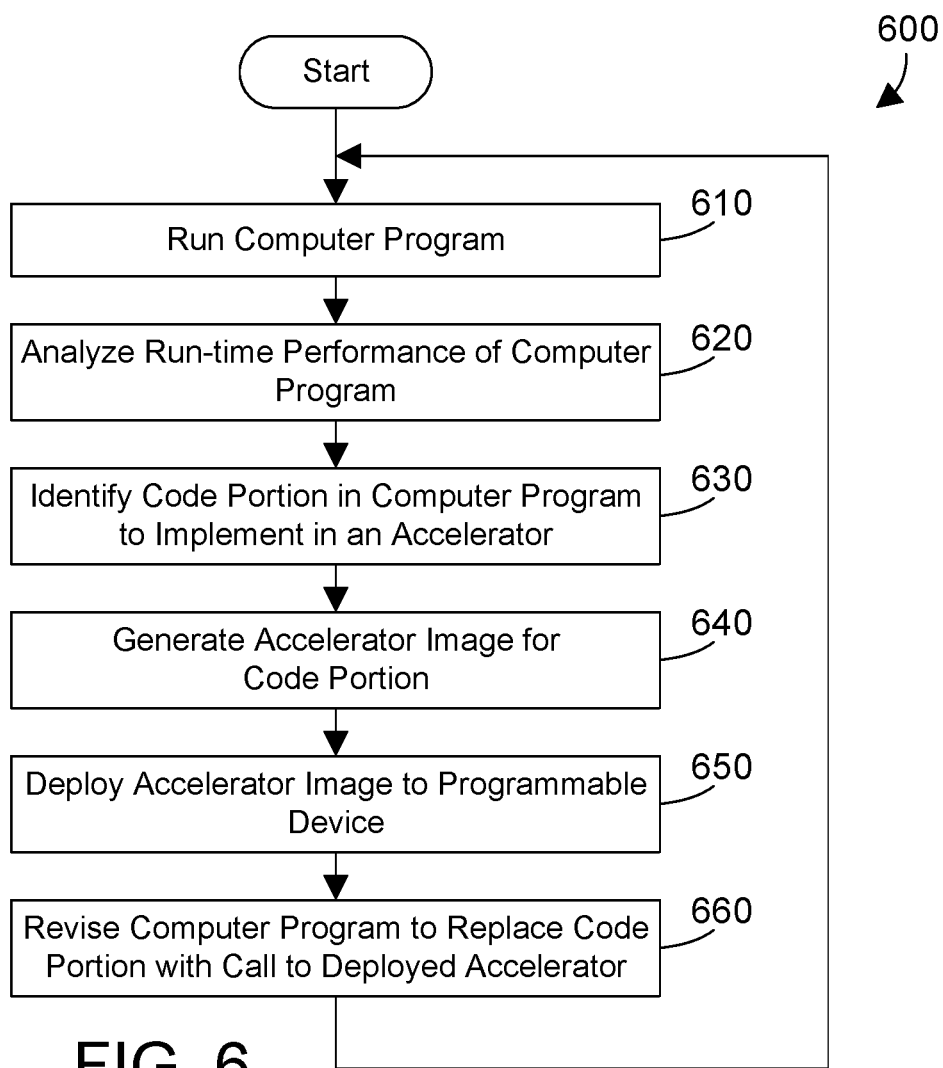
FIG. 6 is a flow diagram of a method for identifying a code portion in a computer program, dynamically generating and deploying an accelerator that corresponds to the code portion, then revising the computer program to replace the code portion with a call to the deployed accelerator.

Referring to FIG. 6, a method 600 starts by running the computer program (step 610). The run-time performance of the computer program is analyzed (step 620). This can be done, for example, by the code analyzer 325 shown in FIGS. 3 and 5 and discussed above. A code portion in the computer program is identified to implement in an accelerator (step 630). An accelerator image for the code portion is generated (step 640). The accelerator image is deployed to a programmable device (step 650). The computer program is then revised to replace the code portion with a call to the deployed accelerator (step 660). At this point, the deployed accelerator will perform the functions in hardware that were previously performed by the code portion, thereby improving the run-time performance of the computer program. Note that method 600 loops back to step 610 and continues, which means method 600 can iterate to continuously monitor the computer program and deploy accelerators, as needed, to improve performance of the computer program.

Figure 7:
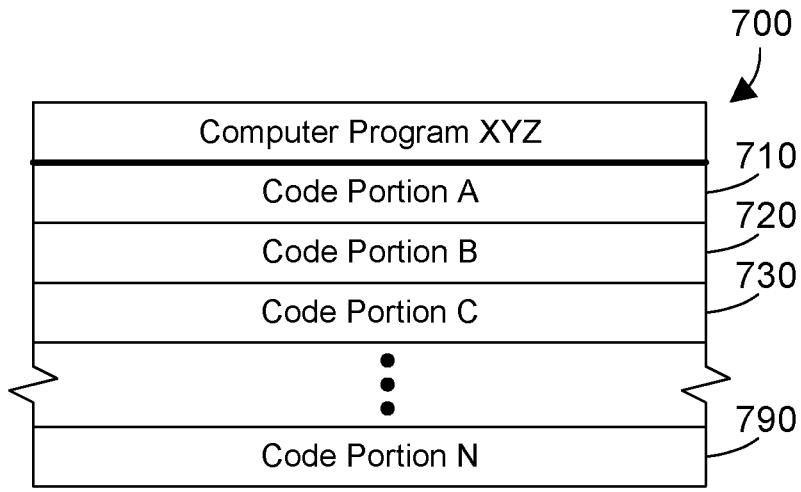
FIG. 7 is a block diagram showing a first sample computer program with different code portions.
Figure 8:
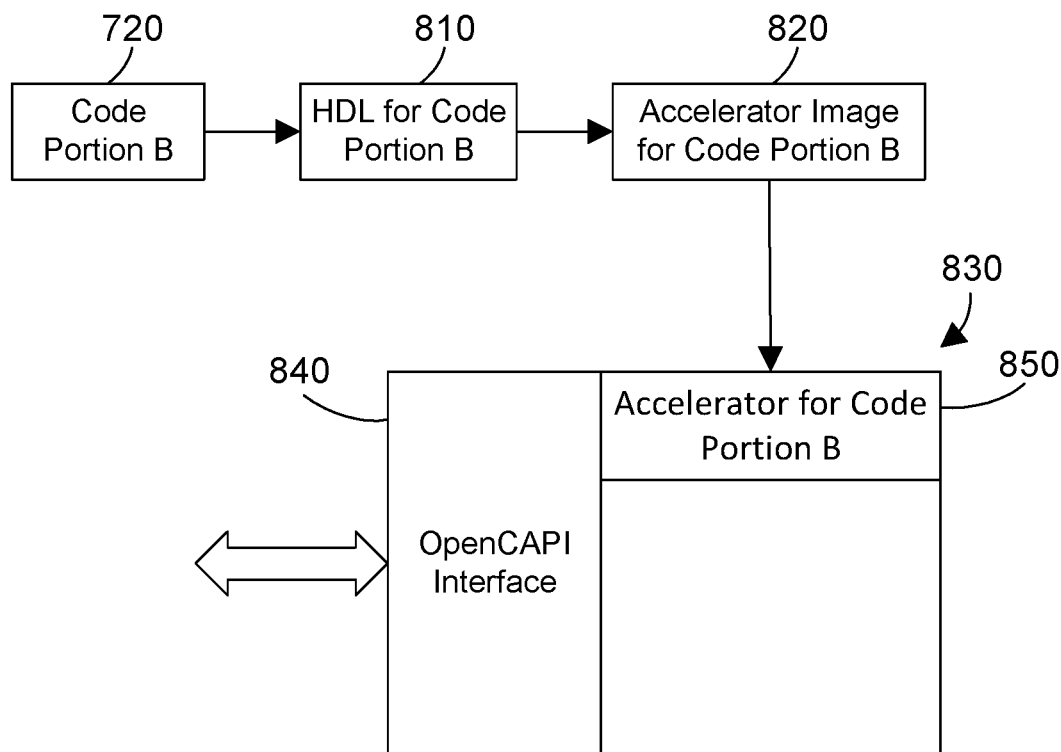
FIG. 8 is a block diagram showing how a code portion can be transformed to HDL, then to an accelerator image, which can be deployed to a programmable device to provide an accelerator.

Some examples are now provided to illustrate the concepts discussed above. FIG. 7 shows a sample computer program 700 that includes multiple code portions, shown in FIG. 7 as code portion A 710, code portion B 720, code portion C 730, . . . , code portion N 790. We assume code portion B 720 is identified as a code portion that will be improved from being implemented in a hardware accelerator. Code portion B 720 is then converted to a corresponding HDL representation 810, as shown in FIG. 8. The HDL for code portion B 810 is then used to generate an accelerator image for code portion B 820. This could be done, for example, using the method shown in FIG. 4, or using any other suitable method. Once the accelerator image for code portion B 820 has been generated, the accelerator image is loaded into a programmable device 830 to generate the accelerator for code portion B 850. Programmable device 830 is one suitable implementation for the programmable device 312 shown in FIG. 3, and preferably includes an OpenCAPI interface 840.

Figure 9:
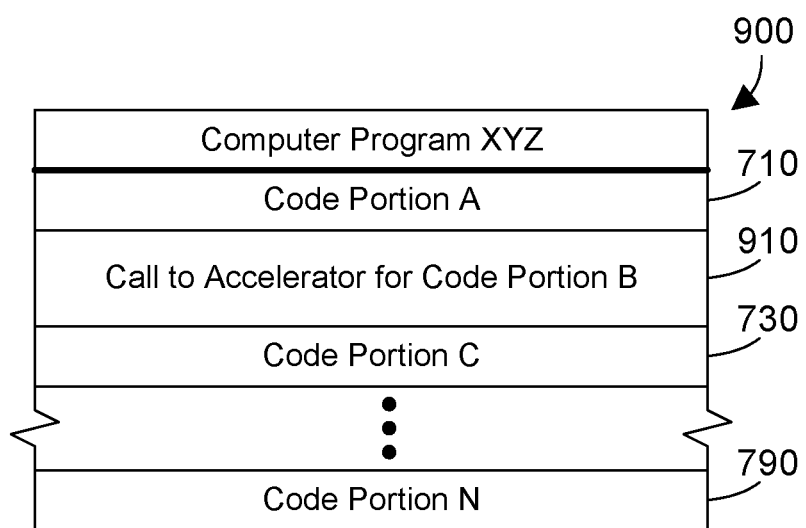
FIG. 9 is a block diagram showing the computer program in FIG. 7 after code portion B has been replaced with a call to the accelerator for code portion B.

Once the accelerator is deployed in the programmable device 830, the code portion B in the computer program is deleted and replaced by a call to the accelerator for code portion B 910 shown in FIG. 9. In the most preferred implementation, the accelerator for code portion B includes a return to the code that called it once the processing in the accelerator for code portion B is complete. In this manner the computer program 900, when it needs to execute what was previously code portion B, will make a call to the accelerator for code portion B, which will perform the needed functions in hardware, then return to the computer program. In this manner a suitable accelerator may be automatically generated for an identified code portion to increase the run-time performance of the computer program.

In a first implementation, an accelerator may be dynamically generated to improve the performance of a computer program, as shown in FIGS. 4-9 and described above. In a second implementation, once an accelerator is dynamically generated, it can be stored in a catalog so it may be reused when needed. FIG. 10 shows a sample accelerator catalog 1000, which is one suitable implementation for the accelerator catalog 329 shown in FIG. 3. An accelerator catalog may include any suitable data or information that may be needed for an accelerator or the corresponding code portion. For the specific example shown in FIG. 10, accelerator catalog includes each of the following fields: Name, Location, Least Recently Used (LRU), Most Recently Used (MRU), Dependencies, Capabilities, Latency, and Other Characteristics. The Name field preferably includes a name for the accelerator. The name field may also include a name for a code portion that corresponds to the accelerator. The location field preferably specifies a path that identifies the location for the accelerator image. While the accelerator image could be stored in the catalog 1000, in the most preferred implementation the catalog 1000 instead includes a path to storage external to the accelerator catalog 1000 where the accelerator image is stored. The least recently used (LRU) field could include the time when the accelerator was used the first time. In the alternative, the LRU field could include a flag that is set when the accelerator is the least recently used of all the accelerators in the catalog. The most recently used (MRU) field could include the time when the accelerator was last used. In the alternative, the MRU field could include a flag that is set when the accelerator is the most recently used of all the accelerators in the catalog. The error rate field provides a suitable error rate for the accelerator, and can be expressed in any suitable way. For the example in FIG. 10, the error rate is expressed as a number X of errors per 100 runs of the accelerator. The error rate field could include any suitable error information that could be, for example, dynamically monitored so an increase in the error rate could result in a notification to take corrective action. The dependencies field may indicate any dependencies the accelerator may have. For example, the dependencies field could specify the specific programmable device the accelerator was designed for. The dependencies field could also specify any dependencies on other accelerators. Thus, accelerator Acc1 in FIG. 10 has a dependency on Acc2, which means Acc1 needs Acc2 to also be implemented. The capabilities field can provide any suitable indication of the capabilities of the accelerator. In the two entries shown in FIG. 10, the capabilities are shown as floating point (FP) Unit for Acc1 and Graphics for AccN. Note, however, the capabilities can be indicated in any suitable way. For example, the capabilities could include a specification of the code portion for which the accelerator was implemented. A separate index could be maintained that correlates each code portion to its corresponding accelerator, along with a descriptor or other data that describes attributes of the code portion. The capabilities field could include any suitable information, such as a pointer to the index, so the code portion corresponding to the accelerator could be easily identified.

The latency field preferably specifies average latency for the accelerator. For the example shown in FIG. 10, Acc1 has a latency of 1.0 microseconds while accelerator AccN has a latency of 500 nanoseconds. Latency could represent, for example, the time required for the accelerator to perform its intended function. The other characteristics field can include any other suitable information or data that describes or otherwise identifies the accelerator, its characteristics and attributes, and the code portion corresponding to the accelerator. For the two sample entries in FIG. 10, the other characteristics field indicates Acc1 includes a network connection, and AccN has an affinity to Acc5, which means AccN should be placed in close proximity to Acc5 on the programmable device, if possible. The various fields in FIG. 10 are shown by way of example, and it is within the scope of the disclosure and claims herein to provide an accelerator catalog with any suitable information or data.

Figure 11:
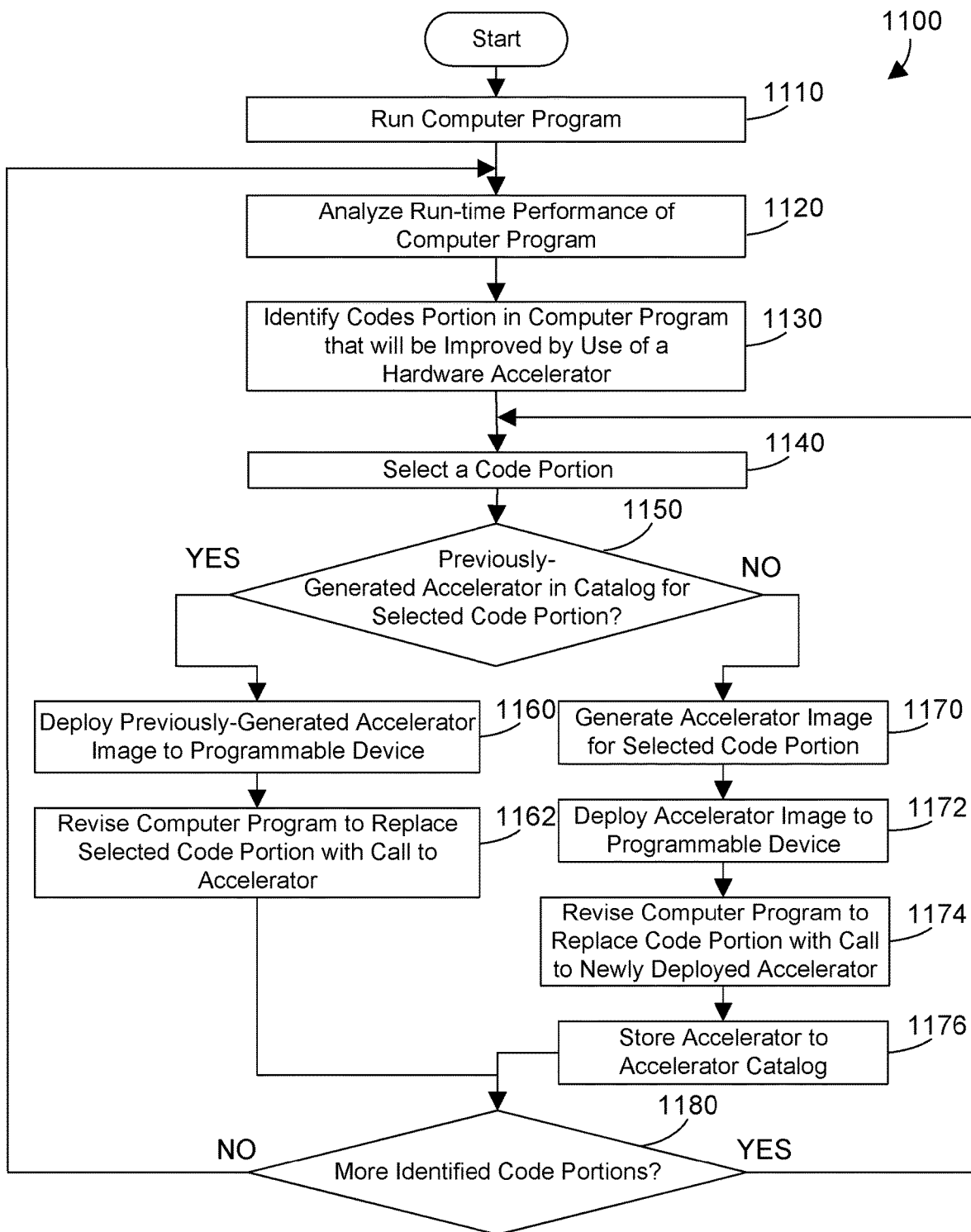
FIG. 11 is a flow diagram of a method for deploying an accelerator for a code portion when a catalog of previously-generated accelerators is maintained.

Referring to FIG. 11, a method 1100 in accordance with the second implementation begins by running the computer program (step 1110). The run-time performance of the computer program is analyzed (step 1120). One or more code portions in the computer program that will be improved by use of a hardware accelerator are identified (step 1130). One of the identified code portions is selected (step 1140). When there is a previously-generated accelerator in the accelerator catalog for the selected code portion (step 1150=YES), the previously-generated accelerator image is deployed to the programmable device (step 1160) to provide the accelerator. The computer program is then revised to replace the selected code portion with a call to the accelerator (step 1162). When there is no previously-generated accelerator in the catalog for the selected code portion (step 1150=NO), an accelerator image for the selected code portion is dynamically generated (step 1170), the accelerator image is deployed to a programmable device (step 1172), the computer program is revised to replace the code portion with a call to the newly deployed accelerator (step 1174), and the accelerator is stored to the accelerator catalog (step 1176). When the accelerator image is stored within the catalog entry, step 1176 write the accelerator image to the catalog. When the accelerator image is stored in storage external to the catalog, step 1176 stores the accelerator image to the external storage and writes an entry to the accelerator catalog that includes a path to the accelerator image in the external storage.

When there are more identified code portions (step 1180=YES), method 1100 loops back to step 1140 and continues. When there are no more identified code portions (step 1180=NO), method 1100 loops back to step 1120 and continues. This means method 1100 most preferably continuously monitors the computer program and dynamically generates and/or deploys accelerators as needed to improve the run-time performance of the computer program.

Figure 15:
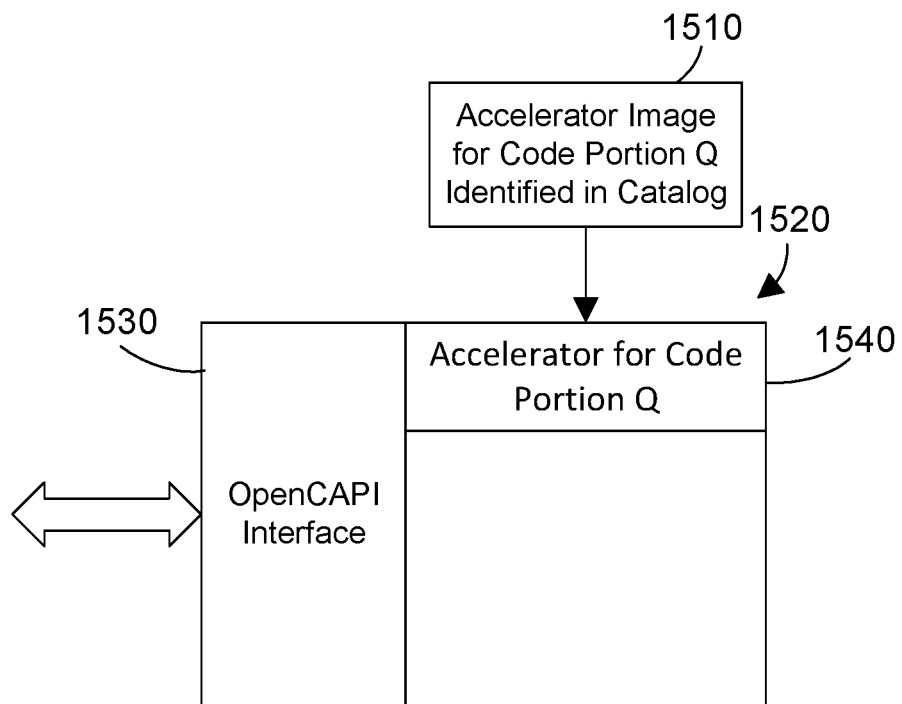
FIG. 15 is a block diagram showing the deployment of an accelerator image for code portion Q identified in the catalog in FIG. 14 to a programmable device.

An example is now provided to illustrate the concepts in FIG. 11 that relate to the second preferred implementation. FIG. 12 shows a sample computer program 1200 that includes many code portions, represented in FIG. 12 as code portion P 1210, code portion Q 1220, code portion R 1230, . . . , code portion Z 1290. We assume steps 1110, 1120 and 1130 in FIG. 11 are performed. In step 1130, we assume code portion Q 1220 and code portion R 1230 are identified as code portions that will be improved by implementing these code portions in an accelerator, as shown in table 1300 in FIG. 13. We further assume we have an accelerator catalog 1400 that is one suitable implementation for the accelerator catalog 329 shown in FIG. 3. Accelerator catalog 1400 has a single entry for AccQ, which we assume is an accelerator for code portion Q 1220 that was generated previously. Because the accelerator for code portion Q was previously-generated, the corresponding accelerator image can be used without having to generate the accelerator image anew. We assume code portion Q 1220 is selected in step 1140. There is a previously-generated accelerator in the catalog for code portion Q (step 1150=YES), so the previously-generated accelerator image corresponding to code portion Q 1510 is deployed to the programmable device (step 1160), as shown in FIG. 15. Deploying the accelerator image for code portion Q 1510 identified in the catalog to the programmable device 1520 results in implementing the accelerator for code portion Q 1540 in the programmable device 1520. The accelerator for code portion Q 1540 may then be called by the computer program to perform the functions of previous code portion Q in hardware, thereby increasing the run-time performance of the computer program. The programmable device 1520 is one suitable example of a programmable device 312 shown in FIG. 3, and preferably includes an OpenCAPI interface 1530.

Figure 16:
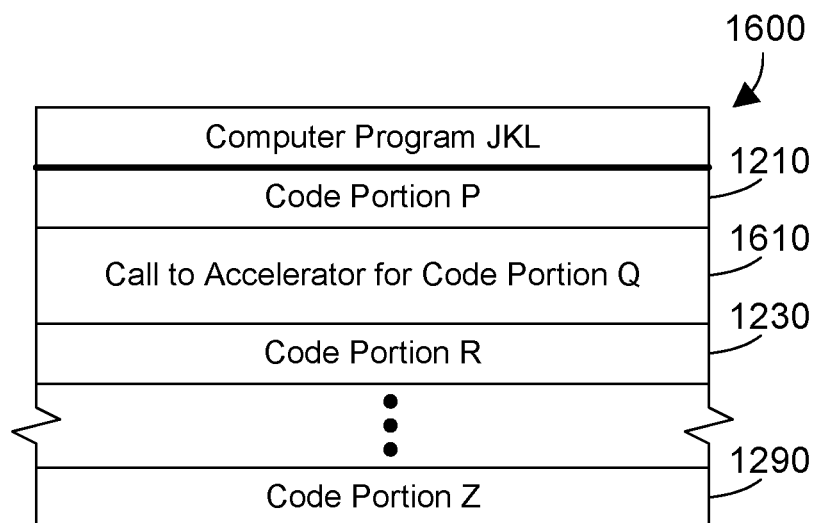
FIG. 16 is a block diagram showing the computer program in FIG. 12 after code portion Q has been replaced with a call to the accelerator for code portion Q.

The computer program is then revised to replace the selected code portion Q 1220 with a call to the accelerator for code portion Q (step 1162). FIG. 16 shows the computer program 1200 in FIG. 12 after the code portion Q has been replaced with the call to the accelerator for code portion Q, as shown at 1610 in FIG. 16. Thus, computer program 1600, instead of executing code portion Q, instead invokes the accelerator for code portion Q 1540 in the programmable device 1520 to increase the run-time performance of the computer program.

Figure 17:
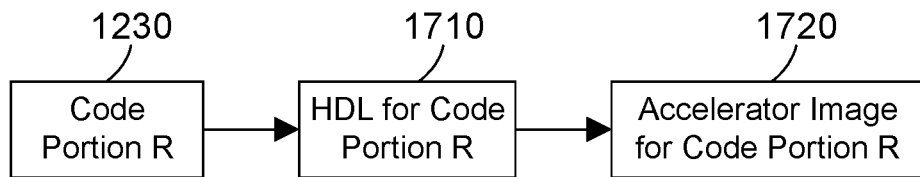
FIG. 17 is a block diagram showing generation of an accelerator image from code portion R in the computer program shown in FIGS. 12 and 16.
Figure 18:
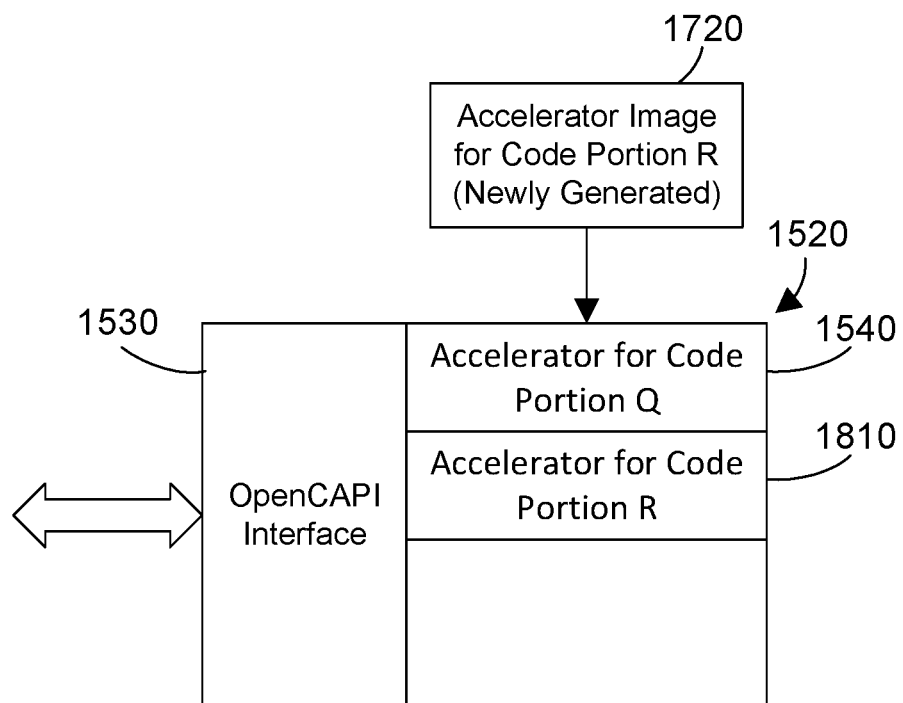
FIG. 18 is a block diagram showing the deployment of a newly-generated accelerator image for code portion R to a programmable device.
Figures 19, 20:
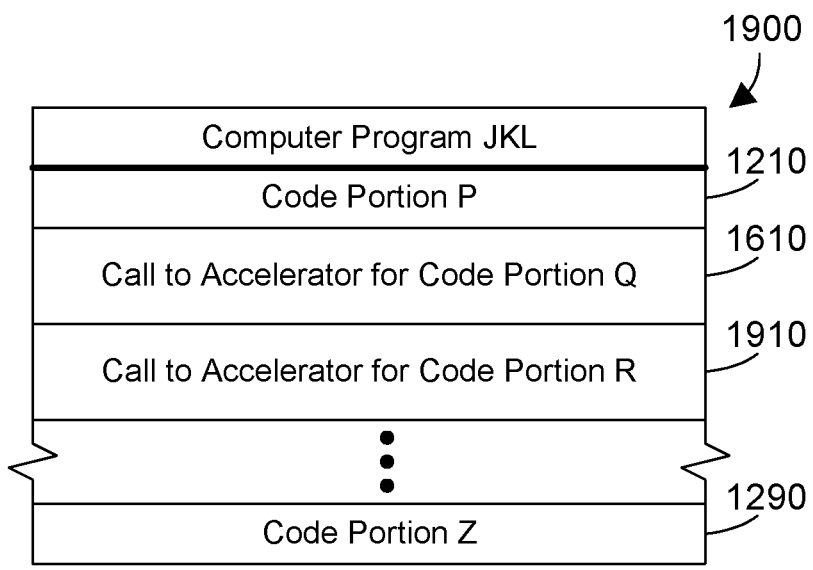
FIG. 19 is a is a block diagram showing the computer program in FIG. 16 after code portion R has been replaced with a call to the accelerator for code portion R.
FIG. 20 is a block diagram of the accelerator catalog 1400 shown in FIG. 14 after an entry is created representing the accelerator for code portion R.

There is still an identified code portion (step 1180=YES), namely code portion R shown in FIG. 13, so method 11 in FIG. 11 loops back to step 1140, where code portion R 1230 is selected (step 1140). There is no previously-generated accelerator in the catalog 1400 shown in FIG. 14 for code portion R (step 1150=NO), so an accelerator image is dynamically generated for code portion R (step 1170). This is represented in FIG. 17, where the code portion R 1230 is used to generate HDL for code portion R 1710, which is used to generate the accelerator image for code portion R 1720. The accelerator image for code portion R 1720, which was newly dynamically generated, is then deployed to the programmable device (step 1172). This is shown in FIG. 18, where the programmable device 1520 that already includes accelerator for code portion Q 1540 is loaded with the accelerator image for code portion R 1720 to generate the accelerator for code portion R 1810. The computer program is then revised to replace code portion R with the call to the accelerator for code portion R (step 1174), as shown at 1910 in FIG. 19. The accelerator for code portion R is also stored in the accelerator catalog (step 1176), resulting in the accelerator catalog 1400 containing entries AccQ and AccR corresponding to two accelerators, as shown in FIG. 20.

Figure 21:
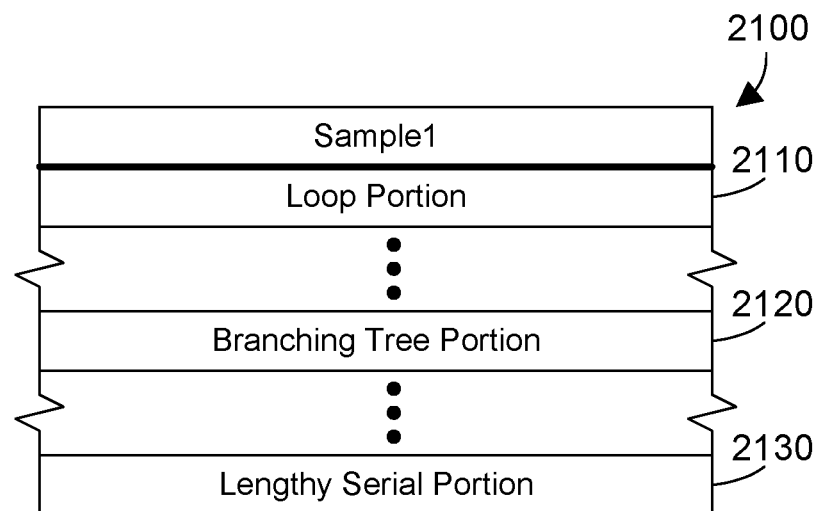
FIG. 21 is a block diagram of a sample computer program.
Figure 22:
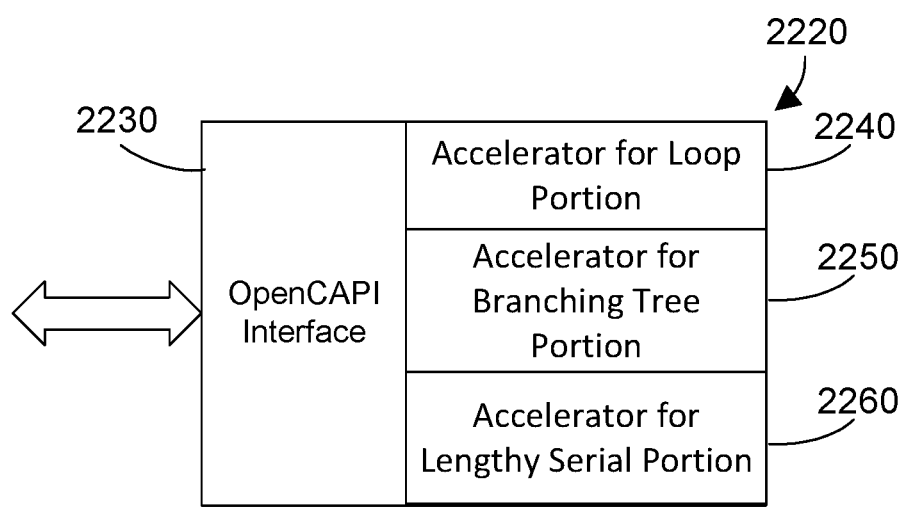
FIG. 22 is a block diagram of a programmable device that has an OpenCAPI interface and includes an accelerator for the loop portion in FIG. 21, an accelerator for branching tree portion in FIG. 21, and an accelerator for lengthy serial portion in FIG. 21.

A more specific example is shown in FIGS. 21 and 22. For this example we assume a computer program called Sample1 2100 includes three different code portions of interest, namely a loop portion 2110, a branching tree portion 2120, and a lengthy serial portion 2130. Loop portion 2110 is representative of a code portion that is a loop that can be unrolled because each iteration is largely independent from other iterations. Due to the independence of each iteration, the loop can be unrolled, and the loop function can be deployed to an accelerator so each iteration will run in parallel in hardware. Financial risk calculations sometimes include code portions such as loop portion 2110. Running different iterations of the loop in parallel in a hardware accelerator increases the run-time performance of the Sample1 computer program.

Computer program Sample1 2100 also includes a branching tree portion 2120. We assume for this example branching tree portion 2120 operates on one or more relatively deep branching trees. In this case, the branching tree portion 2120 can be deployed to an accelerator so each branch of the branching tree will run in parallel in hardware, the branch selection criteria will be calculated, and at the final stage of the logic, the result will be selected from the selected branch. Running different branches of the branching tree in parallel in a hardware accelerator increases the run-time performance of the Sample1 computer program.

Computer program Sample1 2100 also includes a lengthy serial portion 2130. We assume for this example the lengthy serial portion 2130 can be shortened by leveraging unique hardware capabilities in an accelerator. Some math functions, for example, could by lengthy serial portions that could be implemented in an accelerator. Running a lengthy serial portion in hardware increases the run-time performance of the Sample1 computer program.

We assume the code portions in FIG. 21 are identified according to profile data 520 generated by the code profiler 510 in FIG. 5. The criteria used by the code selection tool 530 to select the code portions 2110, 2120 and 2130, which are examples of code portion 326 in FIGS. 4 and 5, may be any suitable criteria. The three example code portions 2110, 2120 and 2130 in FIG. 21 as described above indicate suitable criteria that could be used by the code selection tool 530 to select code portions 2110, 2120 and 2130 to be implemented in one or more accelerators. Of course, the claims and disclosure herein expressly extend to any suitable criteria for the code selection tool 530 to select one or more code portions to be implemented in one or more accelerators.

FIG. 22 shows a programmable device 2220 that has an OpenCAPI interface 2230 and includes an accelerator for loop portion 2240, an accelerator for branching tree portion 2250, and an accelerator for lengthy serial portion 2260. While these three accelerators are shown to be implemented in the same programmable device 2220 in FIG. 22, one skilled in the art will recognize these could be implemented in separate programmable devices as well.

Figure 23:
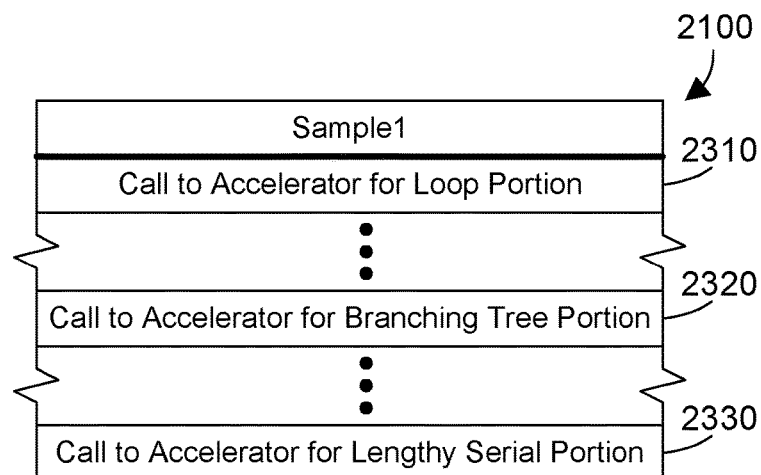
FIG. 23 is a block diagram of the computer program in FIG. 21 after the code portions have been replaced with calls to corresponding accelerators.

FIG. 23 shows the computer program Sample1 2100 after the code portions shown in FIG. 21 are replaced with calls to the hardware accelerators shown in FIG. 22. Thus, loop portion 2110 in FIG. 21 has been replaced by a call to the accelerator for loop portion 2310; the branching tree portion 2320 in FIG. 21 has been replaced by a call to the accelerator for the branching tree portion 2320; and the lengthy serial portion 2130 in FIG. 21 has been replaced by a call to the accelerator for the lengthy serial portion 2330. Because the Sample1 computer program 2100 in FIG. 23 now includes calls to hardware accelerators, the run-time performance of the computer program 2100 is increased.

Figure 24:
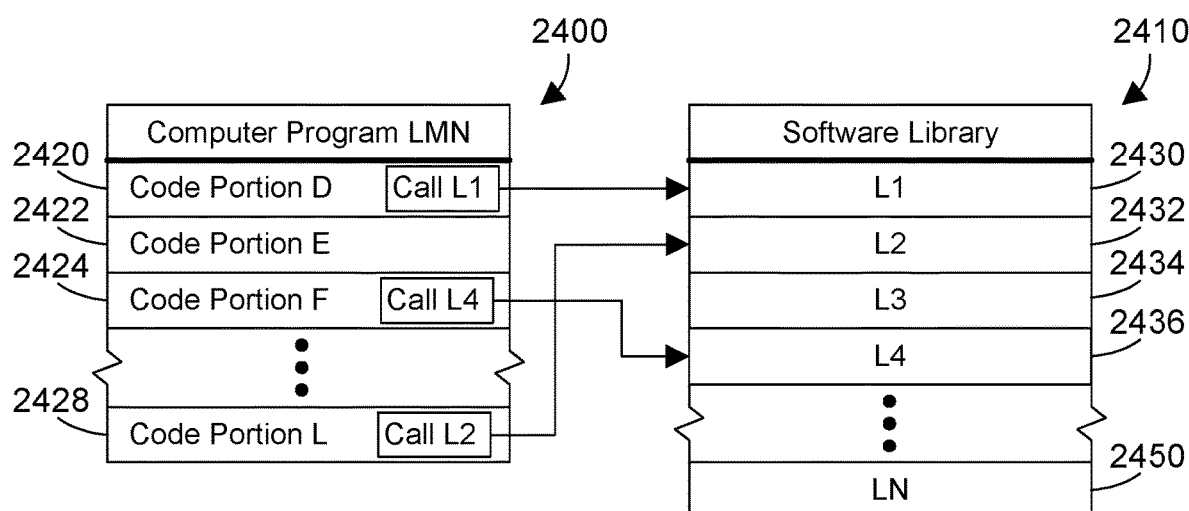
FIG. 24 is a block diagram of a prior art computer program that calls functions in a software library.

FIG. 24 shows a prior art computer program 2400 that includes calls to functions in a software library 2410. Software libraries are very well-known in the art, and provide common functions that programmers can use instead of having to code these common functions. For example, functions that perform compression, graphics operations and XML parsing could be included in a software library. The computer program 2400 includes code portion D 2420, code portion E 2422, code portion F 2424, possibly other code portions not shown, through code portion L 2428. Software library 2410 includes functions L1 2430, L2 2432, L3 2434, L4 2436, possibly other functions, through LN 2450. Code portion D 2420 in computer program 2400 includes a call to function L1 2430 in software library 2410. Code portion F 2424 includes a call to function L4 2436 in software library 2410. Code portion L 2428 includes a call to function L2 2432 in software library 2410.

Figure 25:
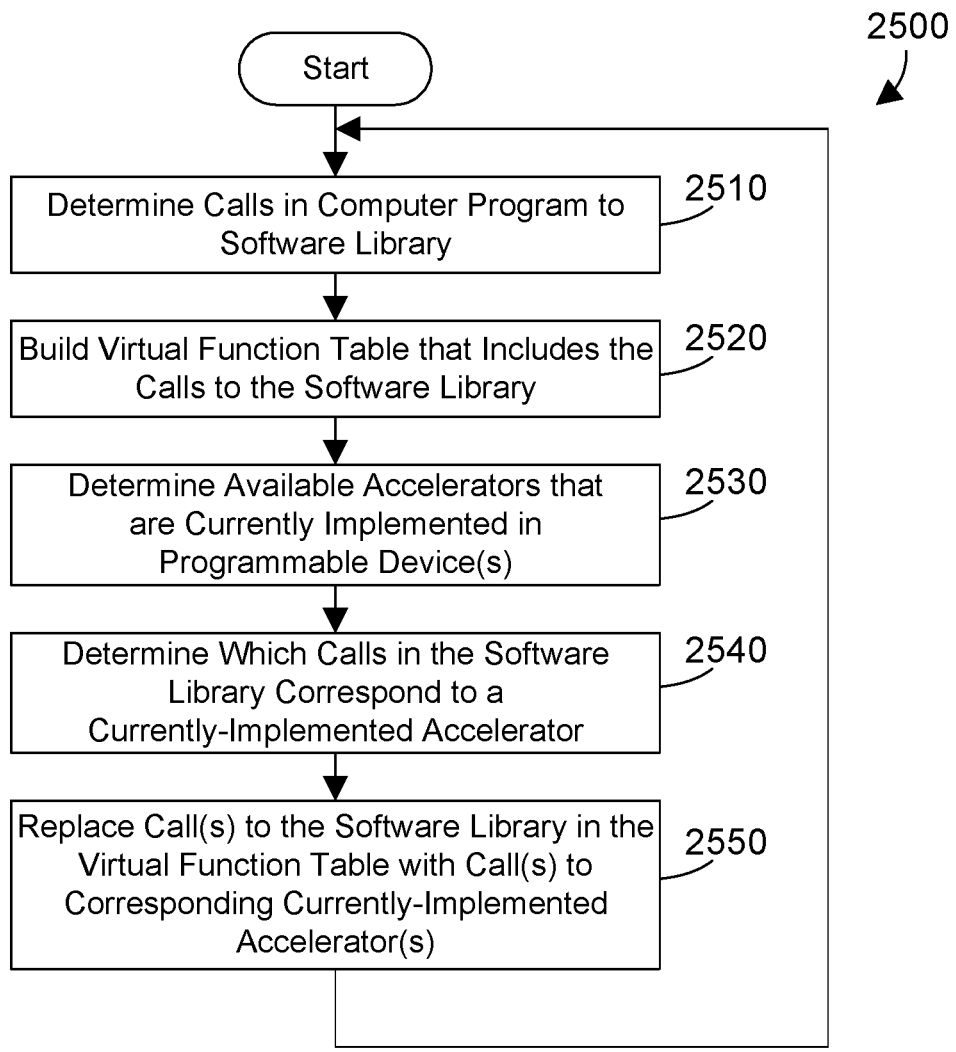
FIG. 25 is a flow diagram of a method for replacing calls to the software library with corresponding calls to one or more currently-implemented accelerators.

Referring to FIG. 25, a method 2500 is preferably performed by the accelerator deployment tool 324 in FIG. 3. Calls in the computer program to the software library are determined (step 2510). A virtual function table is built that includes the calls to the software library (step 2520). The available accelerators that are currently implemented in one or more programmable devices are determined (step 2530). Calls in the software library that correspond to a currently-implemented accelerator are determined (step 2540). One or more function calls to the software library in the virtual function table are then replaced with one or more corresponding calls to a corresponding currently-implemented accelerator (step 2550). Note that method 2500 then loops back to step 2510, indicating this method can continuously performs its functions as accelerators are deployed or removed.

One specific implementation of a virtual function table is shown at 2600 in FIG. 26. The virtual function table 2600 lists calls from the computer program that were previously made directly to the software library, and creates a level of indirection so those calls can be made to an accelerator instead when possible. The calls in the computer program 2400 in FIG. 24 have been replaced by calls to the functions in the virtual function table 2600, as shown in computer program 2700 in FIG. 27. Thus, the call to L1 is replaced with a call to F1; the call to L4 is replaced with a call to F4; and the call to L2 is replaced with a call to F2. The virtual function table 2600 indicates which functions to call for each call from the computer program. When the virtual function table is initially built, each call from the computer program is mapped to the corresponding call to the software library. The modified computer program 2700 and virtual function table 2600 thus provide similar functionality as shown in FIG. 24, but with a level of indirection. Thus, code portion D 2720 calls function F1 in the virtual function table 2600, which generates a call to L1 in the software library. Code portion F 2724 calls function F4 in the virtual function table 2600, which generates a call to L4 in the software library. Code portion L 2728 calls function F2 in the virtual function table, which generates a call to L2 is the software library. We see from this simple example that when the virtual function table is initially built, it provides similar function as shown in FIG. 24, namely, each call to the virtual function table results in a corresponding call to the software library.

FIG. 28 shows an accelerator correlation table 2800. We assume for this example that three accelerators have been deployed, namely Acc1, Acc2 and Acc3. We assume these accelerators correspond to three functions in the software library. Thus, Acc1 corresponds to library function L4; Acc2 corresponds to library function L1; and Acc3 corresponds to library function L2, as indicated in FIG. 28. The correlation between the accelerators and library functions can be determined in any suitable way, including a user manually generating entries to the accelerator correlation table, or the accelerator deployment tool automatically determining the correlation between accelerators and library functions. For accelerators manually generated by a user, the user could use the same library name and function names, thus allowing a code linker to automatically detect the accelerator and create the call to the accelerator instead of to the software library. Similarly, automatically-generated accelerators could use the same library name and function names, allowing the code linker to function in similar fashion to automatically detect the accelerator and create the call to the accelerator instead of to the software library. In a different implementation the accelerator could include data that characterizes its functions, thereby allowing the accelerator to be queried to determine the functions it supports, which information could be used to replace calls to the software library with calls to the accelerator instead.

Figures 29, 30:
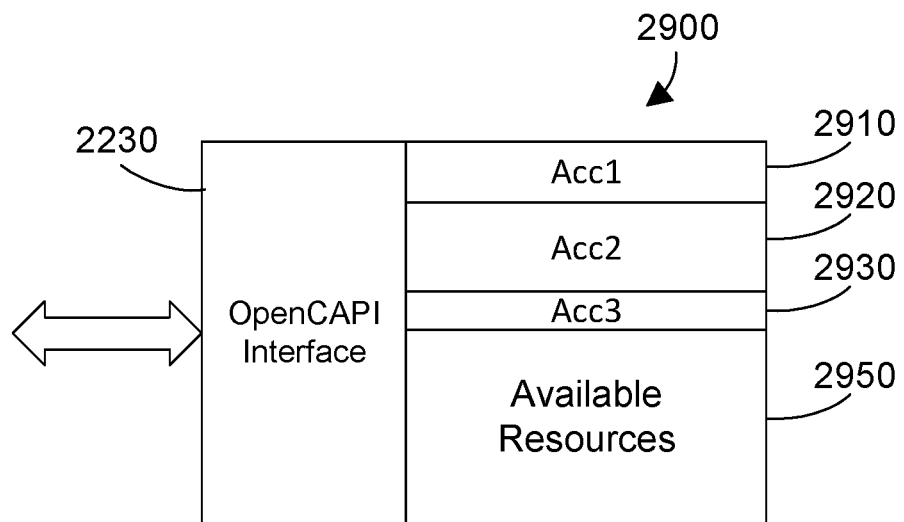
FIG. 29 is a block diagram of a programmable device showing the three currently-implemented accelerators listed in the table in FIG. 28.
FIG. 30 shows the virtual function table in FIG. 26 after calls to the software library have been replaced with calls to corresponding accelerators.

FIG. 29 shows a programmable device 2900 that includes an OpenCAPI interface 2230 and the three accelerators Acc1, Acc2 and Acc3 referenced in FIG. 28. These three accelerators 2910, 2920 and 2930 are currently-implemented accelerators because they already exist in the programmable device 2900. FIG. 29 also shows available resources 2950 on the programmable device 2900 that have not yet been used.

We now consider method 2500 in FIG. 25 with respect to the specific example in FIGS. 26-29. Steps 2510 and 2520 build the virtual function table 2600 in FIG. 26. Step 2530 determines Acc1 2910, Acc2 2920 and Acc3 2930 are currently implemented in a programmable device 2900 and are available for use. Step 2540 reads the accelerator correlation table 2800 to determine that Acc1 corresponds to library function L4; Acc2 corresponds to library function L1; and Acc3 corresponds to library function L2. As discussed above, these library functions could be functions that perform compression, graphics operations, XML parsing, or any other suitable library functions. Step 2550 then replaces calls to the software library in the virtual function table with calls to the currently-implemented accelerators, as shown in the virtual function table 2600 in FIG. 30. The virtual function table thus provides a level of indirection that allows dynamically replacing a call to the software library with a call to an accelerator without the computer program being aware the software library function has been implemented in an accelerator. The result is improved run-time performance of the computer program in a way that is transparent to the computer program.

Figure 31:
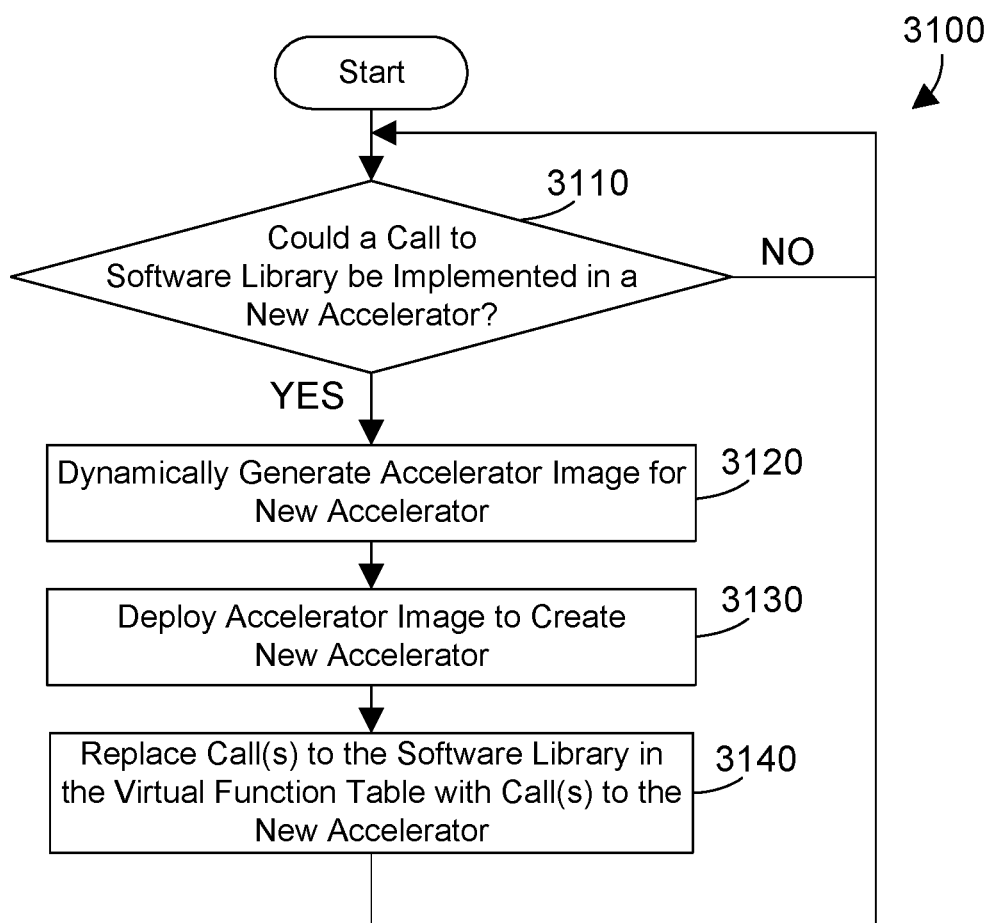
FIG. 31 is a flow diagram of a method for generating a new accelerator and replacing one or more calls to the software library with one or more corresponding calls to the new accelerator.

In an alternative embodiment, not only can currently-implemented accelerators be used to replace calls to software library functions, but a new accelerator can be dynamically generated to replace a call to a software library function as well. Referring to FIG. 31, when a call to the software library cannot be implemented in a new accelerator (step 3110=NO), method 3100 loops back to step 3110 and continues until a call to the software library could be implemented in a new accelerator (step 3110=YES). One factor that comes into play in deciding whether a call to the software library could be implemented in a new accelerator is the available resources on one or more programmable devices. For example, if the available resources 2950 in FIG. 29 provide sufficient resources for implementing a call to the software library in a new accelerator that could be deployed to the available resources 2950, step 3110 could be YES. An accelerator image for the new accelerator is dynamically generated (step 3120). One suitable way to dynamically generate a new accelerator image is using the process in FIG. 4 discussed in detail above. Of course, other ways to dynamically generate an accelerator image are also within the scope of the disclosure and claims herein. The accelerator image dynamically generated in step 3120 is then deployed to a programmable device to create the new accelerator (step 3130). One or more calls to the software library in the virtual function table are replaced with corresponding one or more calls to the new accelerator (step 3140). Method 3100 then loops back to step 3110 and continues, indicating method 3100 can continuously monitor and function to create new accelerators, as needed.

Figures 32, 33:
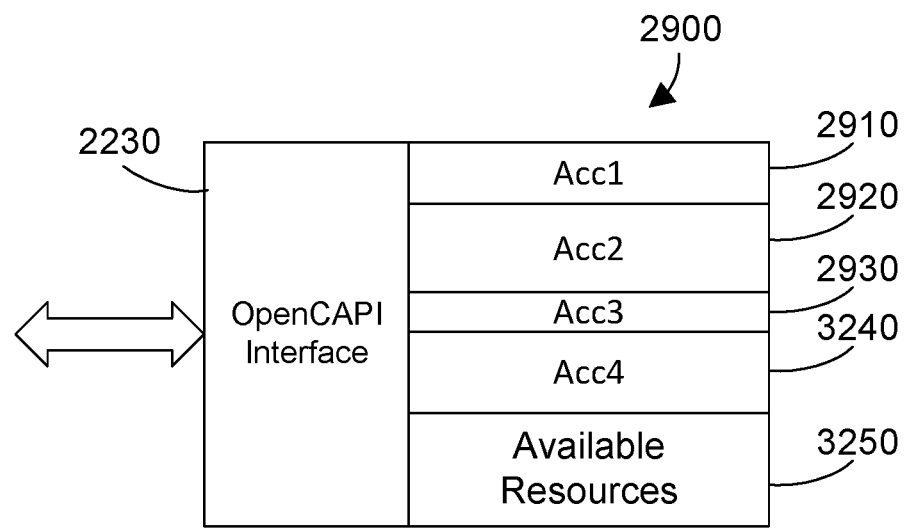
FIG. 32 is a block diagram of a programmable device showing the three previously-generated accelerators and the one new accelerator generated in FIG. 31.
FIG. 33 shows the virtual function table in FIGS. 26 and 30 after calls to the software library have been replaced with corresponding calls to the new accelerator.

We continue with the same example in FIGS. 26-30 in discussing method 3100 in FIG. 31. We assume for this specific example that step 3110 determines the call to L3 in the software library could be implemented in a new accelerator (step 3110=YES). We assume an accelerator image for the new accelerator called Acc4 is generated in step 3120, then deployed to a programmable device in step 3130. We assume the image for Acc4 is deployed to the same programmable device 2900 shown in FIG. 29, resulting in the programmable device 2900 including Acc1 2910, Acc2 2920, Acc3 2930, and Acc4 3240, as shown in FIG. 32. Note the available resources 3250 are less than in FIG. 29 because Acc4 has used some of those resources. Step 3140 in FIG. 31 then replaces the call to L4 in the virtual function table with a call to Acc4, as shown in FIG. 33. At this point, when the computer program calls function F4 in the virtual function table 2600, Acc4 will be called to perform this function instead of performing the function via a call to the software library.

Figure 34:
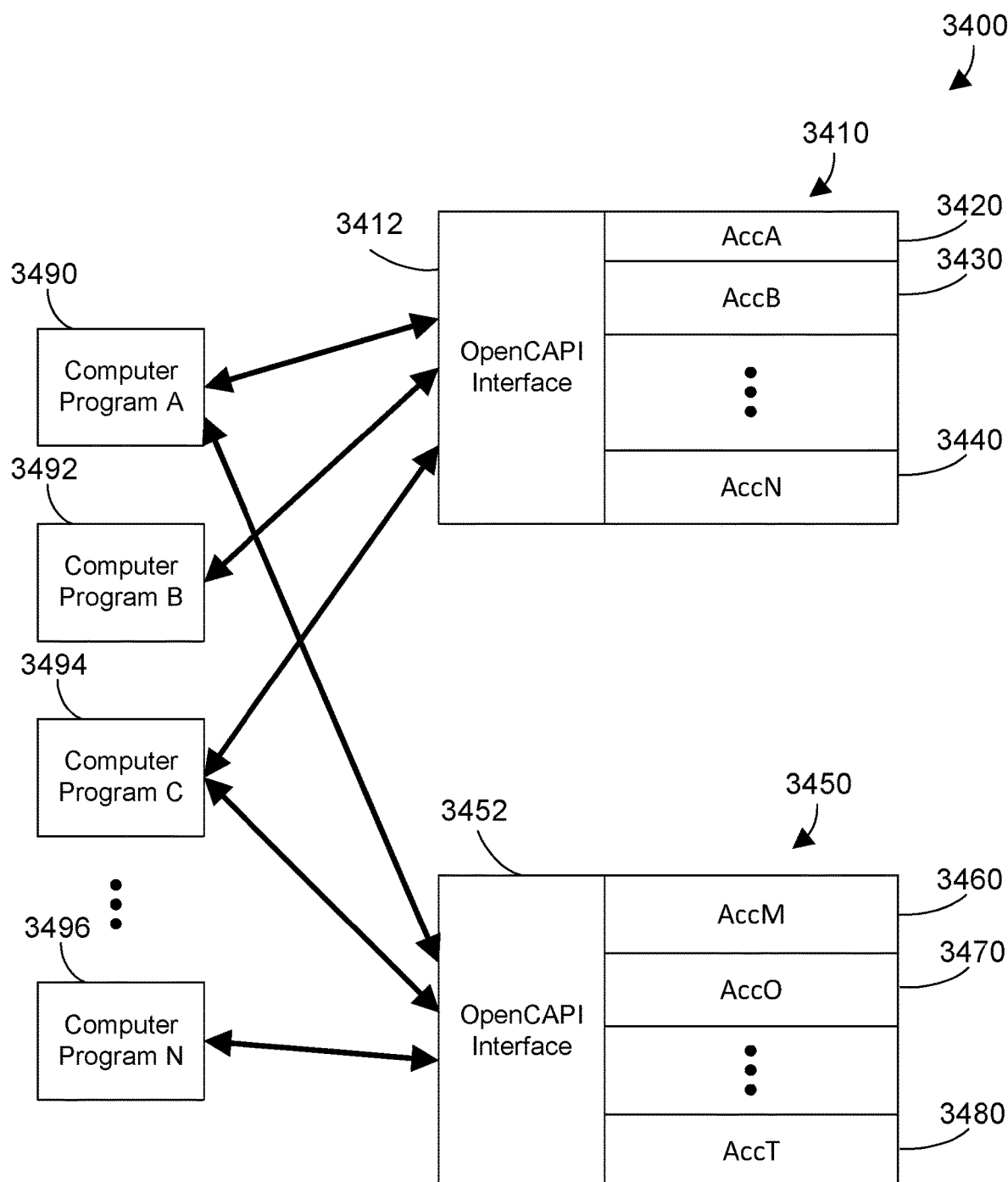
FIG. 34 is a block diagram showing multiple computer programs using multiple accelerators in multiple programmable devices.

Referring to FIG. 34, a sample system 3400 is shown that includes two programmable devices 3410 and 3450 that each include an OpenCAPI interface and multiple accelerators. Programmable devices 3410 and 3450 are preferably Field-Programmable Gate Arrays (FPGAs), but could be other types of programmable devices as well. Programmable device 3410 includes an OpenCAPI interface 3412 and accelerators 3420, 3430, . . . , 3440. Programmable device 3450 similarly includes an OpenCAPI interface 3452 and accelerators 3460, 3470, . . . , 3480. Multiple computer programs are shown that make calls to one or more of the accelerators in the programmable devices via their respective OpenCAPI interfaces. In this simple example, Computer Program A 3490 accesses one or more of the accelerators in the first programmable device 3410 and also accesses one or more of the accelerators in the second programmable device 3450, as shown by the arrows from Computer Program A 3490 to both OpenCAPI interfaces 3412 and 3452. Computer Program B 3492 accesses one or more accelerators in the first programmable device 3410, as shown by the arrow from Computer Program B 3492 to the OpenCAPI interface 3412, but Computer Program B 3492 does not access any of the accelerators in the second programmable device 3450. Computer Program C 3494 accesses one or more of the accelerators in the first programmable device 3410 and also accesses one or more of the accelerators in the second programmable device 3450, as shown by the arrows from Computer Program C 3494 to both OpenCAPI interfaces 3412 and 3452. Computer Program N 3496 accesses one or more accelerators in the second programmable device 3450, as shown by the arrow from Computer Program N 3496 to the OpenCAPI interface 3452, but Computer Program N 3496 does not access any of the accelerators in the first programmable device 3410. While two programmable devices 3410 and 3450 are shown in FIG. 34 by way of example, one skilled in the art will recognize that any suitable number of programmable devices could be provided with any suitable number of accelerators. FIG. 34 simply illustrates that many different computer programs can access many different accelerators in different programmable devices.

Figure 35:
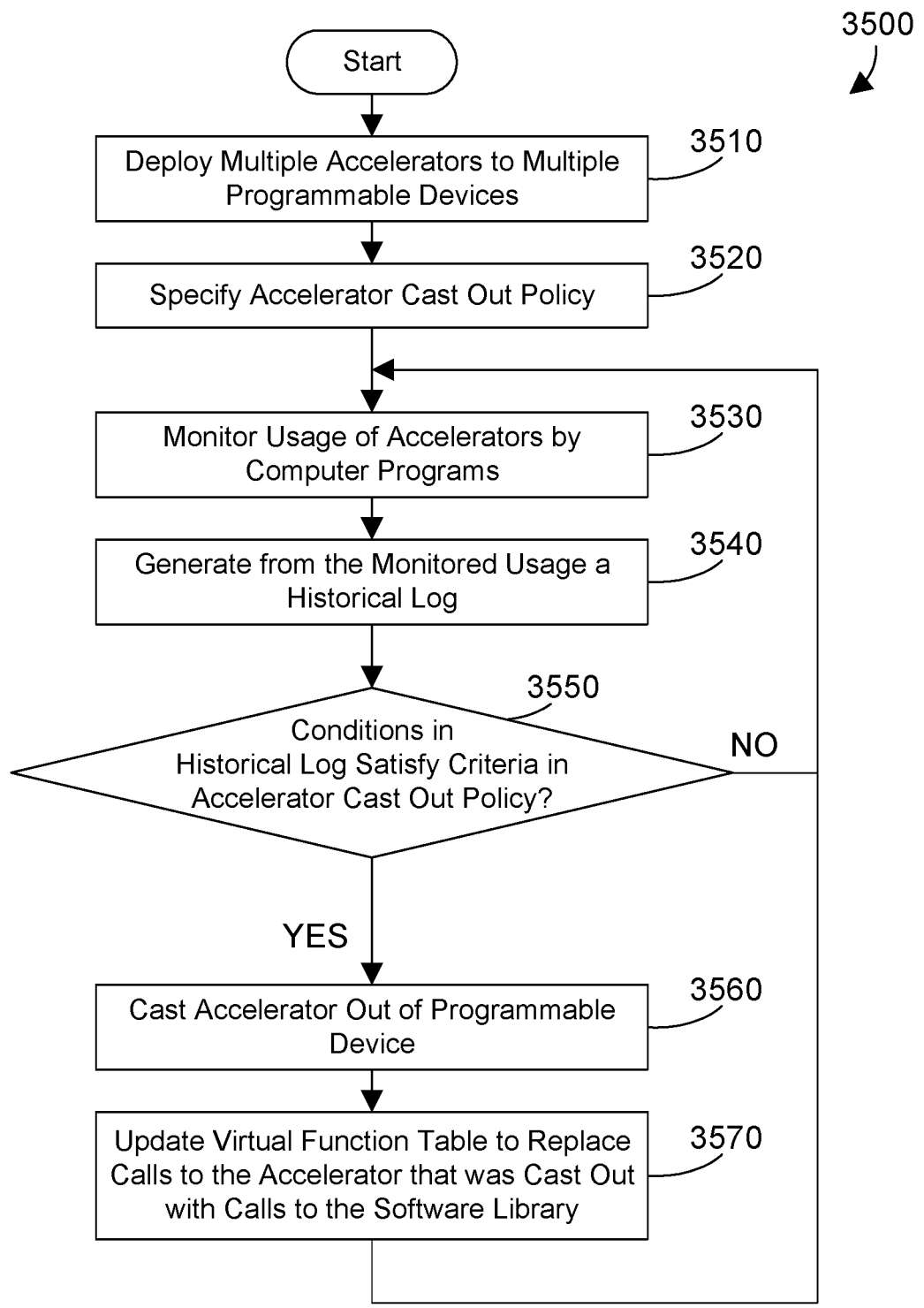
FIG. 35 is a flow diagram of a method for the accelerator manager to manage accelerators.

FIG. 35 shows a method 3500 that represents suitable functions that are preferably performed by the accelerator manager 331 shown in FIG. 3. Multiple accelerators are deployed to multiple programmable devices (step 3510), such as in the example in FIG. 34. An accelerator cast out policy is specified (step 3520). The accelerator cast out policy preferably includes one or more criteria that specify under what conditions an accelerator will be cast out of a programmable device. The accelerator cast out policy, instead of specifying one or more criteria for casting out an accelerator, could instead specify one or more criteria for retaining an accelerator. When an accelerator satisfies conditions specified in the accelerator cast out policy for casting out an accelerator, or no longer satisfies conditions specified in the cast out policy for retaining an accelerator, the accelerator manager may cast out the accelerator from its programmable device.

The accelerator manager monitors usage of accelerators by computer programs (step 3530), and generates from the monitored usage a historical log (step 3540). When conditions in the historical log do not satisfy criteria in the accelerator cast out policy (step 3550=NO), method 3500 loops back to step 3530 and continues without casting out any accelerators. When conditions in the historical log satisfy criteria in the accelerator cast out policy for casting out an accelerator (step 3550=YES), the accelerator is cast out of the programmable device (step 3560), and the Virtual Function Table is updated to replace calls to the accelerator that was cast out with calls to the software library instead (step 3570). Method 3500 continuously monitors the historical log to determine when to cast out accelerators from programmable devices. In this manner the accelerator manager maintains in place accelerators that do not satisfy the cast out policy while casting out accelerators that satisfy the cast out policy.

While step 3560 is discussed above as casting an accelerator out of a programmable device, the casting out need not be done immediately. Instead, an accelerator could be marked to be cast out the next time an accelerator needs to be deployed. In this manner, steps 3560 and 3570 could be delayed until such a time when an accelerator needs to be deployed.

Referring to FIG. 36, the accelerator manager 331 in FIG. 3 is shown with additional details. The accelerator manager 331 preferably includes an accelerator cast out policy 3610 and an accelerator monitor 3620 that generates an accelerator historical log 3630. One suitable example for the accelerator cast out policy 3610 in FIG. 36 is shown in table 3700 in FIG. 37. Examples of suitable criteria that could be used to specify when to cast out an accelerator include: casting out an accelerator that is not used for some specified period of time X 3710; casting out an accelerator that has no connection open 3720; casting out an accelerator that has resource usage greater than some specified threshold Y 3730; and casting out an accelerator that has excessive errors 3740. Simple examples are now provided for the sake of illustrating these different criteria in the accelerator cast out policy 3700. The accelerator manager 331 preferably includes a thermal manager 3640. The thermal manager 3640 is described further below.

Criteria 3710 could specify, for example, to cast out an accelerator that is not used for an hour. Criteria 3710 specifies that when all applications have closed their connections to an accelerator, the accelerator has not more connections, meaning the accelerator may be cast out. Criteria 3730 could look for accelerators that are resource hogs. For example, criteria 3730 could specify that any accelerator that uses more than a specified threshold of bandwidth is cast out. Of course, criteria relating to resources other than bandwidth could also be specified, including memory, disk I/O, etc. Criteria 3740 could specify any suitable errors and/or thresholds for specific errors or for all errors. For example, criteria 3740 could specify that if an accelerator causes more than some specified threshold number of hardware protocol errors, the accelerator should be cast out. Another error that could be specified in criteria 3740 could be memory access violations. Yet another error that could be specified in criteria 3740 could be hang conditions, when the accelerator hangs waiting for something to happen that does not happen within a reasonable amount of time. The accelerator cast out policy disclosed and claimed herein can include any suitable criteria for specifying conditions for retaining or casting out an accelerator.

One suitable example for the accelerator historical log 3630 shown in FIG. 36 is shown in table 3800 in FIG. 38. Accelerator historical log 3800 preferably includes columns for Name, Called By, Connection Open, Resource Usage, Errors, and Other. The Name column contains the name of the accelerator, and can include a path, pointer, or other suitable information for locating the accelerator. The Called By column preferably includes a list of computer programs that called the accelerator, along with a timestamp of when the accelerator was called by that computer program. The Connection Open column preferably includes a binary value that specifies whether the connection to the accelerator is open or not. The Resource Usage column can include usage metrics for any suitable resource, such as bandwidth, memory, disk I/O, etc. Note the resource usage can be specified in absolute terms or can be specified as a percentage. The Error column can include any logged errors for the accelerator. Examples of logged errors include hardware protocol errors, memory access violations, and hang conditions. The Other column is present to simply indicate the accelerator historical log 3800 can include other information not explicitly discussed above. The Other column could include any suitable data relating to the usage of accelerators by the computer programs. For example, the Other column could include the time it took the accelerator to perform its task when called by each computer program.

The accelerators shown in FIGS. 8, 15, 22, 29, 32 and 34 include an OpenCAPI interface. Note, however, the OpenCAPI interface is not strictly necessary to dynamically generate, deploy and manage accelerators as disclosed and claimed herein. Deploying an accelerator to a programmable device that includes an OpenCAPI interface is useful because the OpenCAPI specification is open, allowing anyone to develop to the specification and interoperate in a cloud environment. In addition, the OpenCAPI interface provides lower latency, reducing the "distance" between an accelerator and the data it may consume or produce. Furthermore, OpenCAPI provides higher bandwidth, increasing the amount of data an accelerator can consume or produce in a given time. These advantages of OpenCAPI combine to provide a good environment for implementing a code portion of a computer program in an accelerator, and to lower the threshold for a code portion to be better in an accelerator than in the computer program. However, the disclosure and claims herein apply equally to accelerators that do not include or have access to an OpenCAPI interface.

Figure 39:
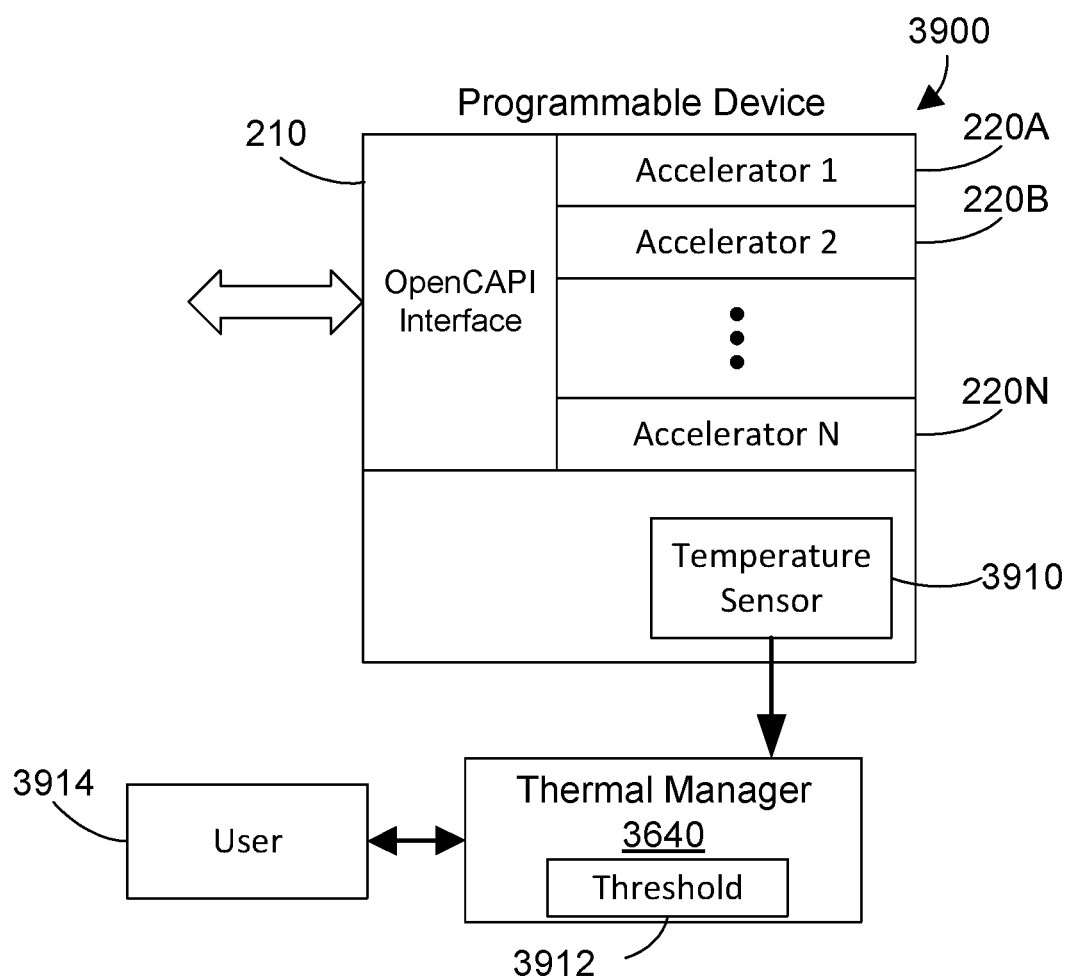
FIG. 39 is a block diagram of a programmable device managed by a thermal manager.

FIG. 39 is a block diagram of a programmable device 3900 managed by a thermal manager 3640 introduced in in FIG. 36. In this example, the thermal manager 3640 is part of the accelerator manager 331 residing in main memory 320 of the computer system 300 as shown in FIG. 3. Note, however, the thermal manager 3640 could be a program separate from the accelerator manager 331. As described above, the accelerator manager 331 may manages multiple accelerators in multiple programmable devices. In this example, the programmable device 3900 includes accelerator 1 220A, accelerator 2 220B, . . . , accelerator N 220N (collectively referred to as accelerators 220). Similar to above, the programmable device 3900 includes an OpenCAPI interface 210. The thermal manager 3640 provides additional function to the accelerator manager 331 for thermal management the programmable device 3900 containing the accelerators 220. Thermal management of the programmable devices may include preventing over-temperature of the programmable devices, the system or board containing the programmable devices, and/or managing power use of the programmable devices as indicated by the temperature.

Again referring to FIG. 39, the thermal manager 3640 monitors the temperature of the programmable device 3900. In this example, the temperature is provided by a temperature sensor 3910 located on the programmable device. Of course, the temperature sensor 3910 could be separate from but thermally coupled to the programmable device 3900. The temperature sensor 3910 senses the temperature of the programmable device 3900 and communicates the temperature to the thermal manager 3640. When the temperature of the programmable device 3900 exceeds a predetermined threshold 3912, the thermal manager may take action to reduce the power usage of the programmable device 3900. The threshold may be provided by a user 3914. In the alternative, the threshold 3912 could be a threshold hard-coded into the thermal manager 3640 or could be a threshold that has its value set by the accelerator manager based on one or more system conditions. The action taken by the thermal manager 3640 may include casting out an accelerator as described above. In addition, where there are multiple accelerators available for a given function the thermal manager may replace a cast out accelerator with another accelerator that provides the same function but uses less power as described further below. The multiple accelerators for the same function may be supplied in any suitable manner. For example, the accelerators could be generated manually or automatically.

In another example, the temperature sensor 3910 may sense multiple temperatures across the accelerator functions Acc1-AccN. The multiple temperatures across the accelerator can provide a temperature profile of the accelerator to the thermal manager. This will give the thermal manager information about the thermal characteristics of the individual accelerator functions and allow the thermal manager to take action in response to a specific function within the programmable device. The place and route function 434 (FIG. 40) could provide the correlation of the temperature sensors and the specific accelerator functions to the thermal manager.

Multiple accelerators may be generated for a software function automatically using tools such as those described above. An accelerator is essentially a software function that has been implemented in hardware to accelerate the execution of the overall software application by making a call to the hardware accelerator for implemented functions. The described tools in FIG. 4 are used to generate an accelerator image that corresponds to the accelerator function represented in hardware description language. The accelerator image, once loaded into the programmable device, creates an accelerator in the programmable device that may be called as needed by one or more computer programs. The process of generating the accelerator image that corresponds to the software function may be used to produce more than one accelerator image for a given software function.

Figures 40, 41:
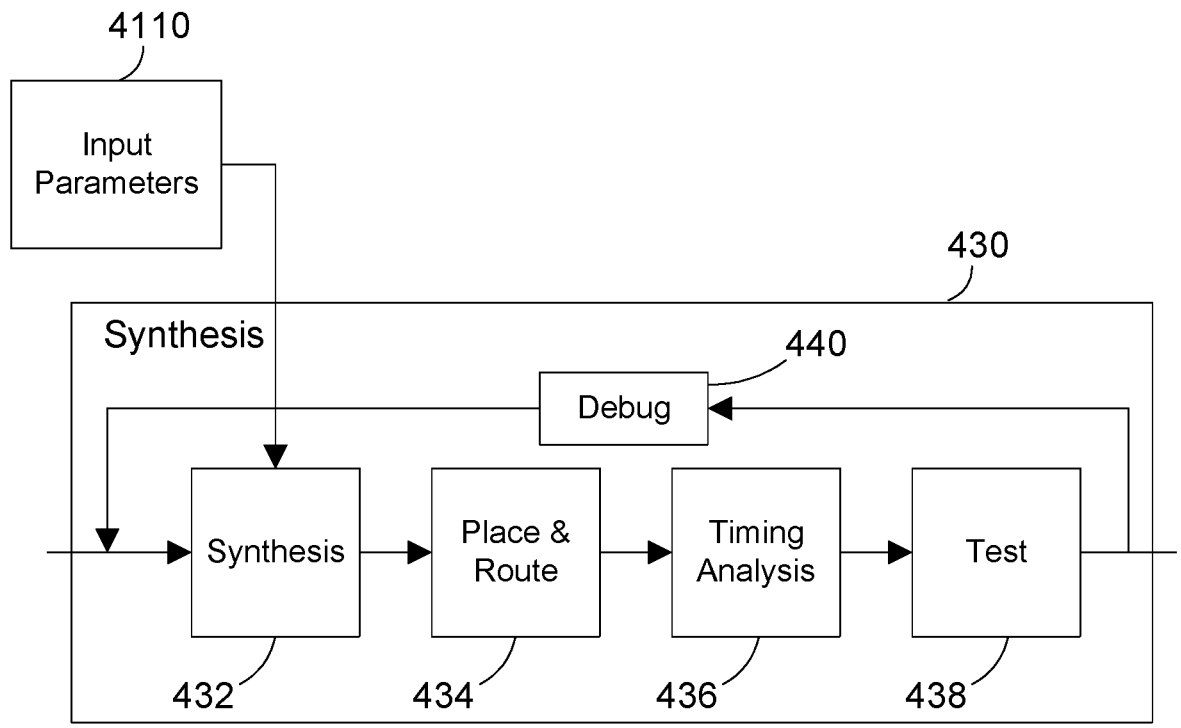
FIG. 40 is a block diagram showing input parameters provided to the synthesis block to generate multiple accelerators for a given function.
FIG. 41 is a block diagram showing a sample accelerator catalog that includes information used by the thermal manager.

FIG. 40 is a block diagram showing input parameters 4110 into the synthesis process 430 to generate multiple accelerators for a given function. Synthesis process 430 shown in FIG. 40 represents the same synthesis process 430 shown in FIG. 4. In the example described above and shown in FIG. 4, an accelerator image generator 327 includes a synthesis process 430 and a simulation process 450 to generate the accelerator image 480 from a code portion 326 that has the input function being accelerated. The synthesis process includes a synthesis block 432, a place and route block 434, a timing analysis block 436, a test block 438 and a debug block 440 as described above. In this example, different input parameters are supplied to the synthesis block 432 to generate multiple accelerators with different power consumptions for a given function.

Again referring to FIG. 40, the input parameters 4110 are used to cause the synthesis block 432 to generate different accelerators for the same input function to the synthesis process 430. The input parameters 4110 may be provided by a user. When generating the accelerator logic, the synthesis process must make various tradeoffs between desired goals such as speed and size, where the size will typically correlate to power used by the resulting logic circuit. The input parameters 4110 may instruct the synthesis block 432 to maximize a specific goal thereby creating an accelerator with a desired characteristic. For example, the input parameter 4110 may instruct the synthesis process 432 to maximize the speed of an accelerator. The resulting accelerator would then likely have a larger size, meaning more circuitry on the programmable device used, and thus uses more power. Conversely, where the input parameter 4110 instructs the synthesis process 432 to minimize the size of an accelerator image, the resulting accelerator image would then have a smaller size and use less power but may be slower. The input parameters 4110 can thus cause the synthesis block 430 to create multiple versions of an accelerator that each has a different power rating.

The thermal manager 3640 may store the multiple accelerator images to later allow the thermal manager to select one of the accelerator images as described further below. The thermal manager 3640 may store the accelerator images in any suitable location in memory or in a scratch pad memory on programmable device. FIG. 41 illustrates an example of storing the accelerator image in an accelerator catalog 4100 that includes information about multiple accelerators for the same function. The accelerator catalog 4100 is another suitable implementation for the accelerator catalog 329 shown in FIG. 3. The accelerator catalog 4100 may be the same accelerator catalog 1000 show in FIG. 10 with the additional information shown in FIG. 41 or could be a different catalog. In this example, the accelerator catalog 4100 includes each of the following for each accelerator image in the catalog: name 4110, speed 4112 and power score 4114. The name 4110 preferably includes a name for the accelerator and may also refer to the name for a function or code portion that corresponds to the accelerator. The speed 4112 may indicate the amount of time for the accelerator to complete an operation, or other suitable time metric. The power score 4114 is a metric that indicates a relative power usage of the accelerator. Examples of the power score are described below.

Again referring to FIG. 41, the thermal manager 3640 uses the power score 4114 to compare accelerator images. In the example in FIG. 41 there are two accelerator names with multiple accelerator images having different power scores, namely Acc1 and Acc2. As shown, the first accelerator, Acc1 has two versions Acc1A and Acc1B. Accelerator Acc1A has a speed of 0.2 ms and a power score of 5. Accelerator Acc1B has a speed of 0.1 ms and a power score of 2. The accelerator manager may initially deploy Acc1A for the higher speed. At some later time when the temperature of the programmable device exceeds the threshold, the thermal manager may cast out Acc1A and replace it with Acc1B to reduce the power of the programmable device and thereby lower the temperature.

The power score 4114 can be calculated and represented in any suitable way to compare the relative power used by the different accelerators for a given function. For example, the power score 4114 may be empirically derived for the accelerator, calculated or estimated. For example, a power score for an accelerator may be calculated by adding a power usage for each logical device in the synthesized accelerator image. Alternatively, the power score could represent the area used by the accelerator on the programmable device. The power score may then be represented as a number based on the percentage of circuitry used compared to the total area of the programmable device or based on the actual area number. The actual power score of an accelerator may not be particularly important. The power score for an accelerator relative to another accelerator for the same function or code portion is what is used by the thermal manager 3640 to determine how and when to cast out accelerators and whether to replace the cast out accelerator with another.

Figure 42:
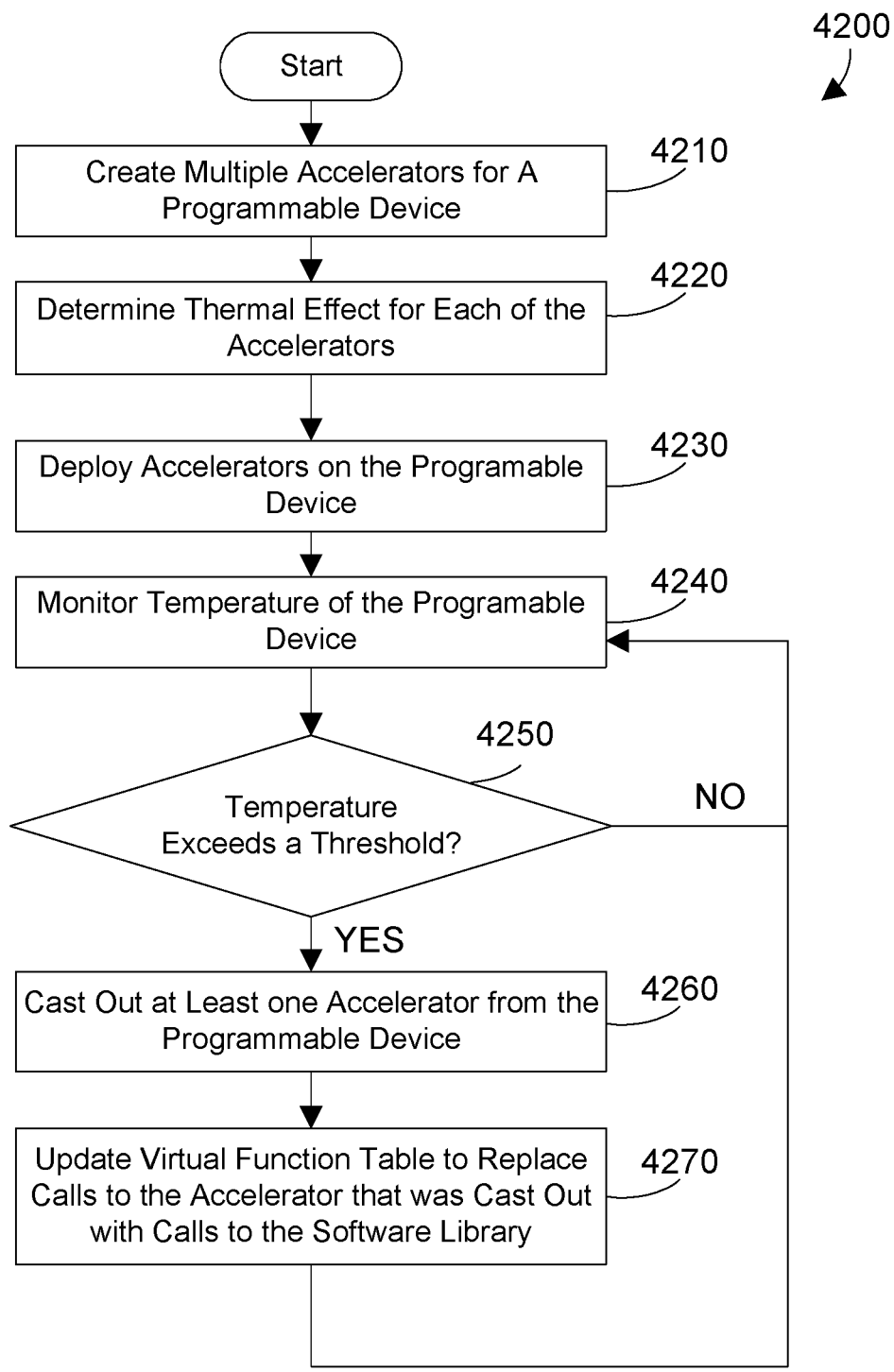
FIG. 42 is a flow diagram of a method for the thermal manager to manage accelerators in a programmable device.

FIG. 42 is a flow diagram of a method 4200 to manage accelerators in a programmable device. The steps of method 4200 are preferably performed by the thermal manager 3640 and/or the accelerator manager 331. Multiple accelerators are created for a programmable device (step 4210). A thermal effect or power score for each of the accelerators is determined (step 4220). Accelerators are deployed on the programmable device (step 4230). The thermal manager then monitors the temperature of the programmable device (step 4240) to determine when the temperature exceeds a threshold (step 4250). When the temperature does not exceed the threshold (step 4250=no) then return to step 4240. When the temperature does exceed the threshold (step 4250=yes) then the thermal manager casts out a least one accelerator from the programmable device (step 4260). The virtual function table is then updated to replace calls to the accelerator that was cast out with calls to the software library (step 4270). The method continues by returning to continually monitor the temperature of the programmable device (step 4240).

Again referring to FIG. 42, when the accelerators are initially deployed on the programmable device in step 4230 the accelerator manager could consult the power score of the requested accelerator and look for programmable devices that have a desired power score to keep the programmable device within a power score capacity of the device. As accelerators are deployed to the programmable devices, the power score consumption could be tracked to stay within the devices power score. When adding an additional function to the initial deployment, the power score available could be calculated and the accelerator manager could then compare the requested accelerator power score with the power score available to find an appropriate programmable device for deployment. After initial deployment, the thermal manager monitors the temperature and manages the accelerators as described above.

Figure 43:
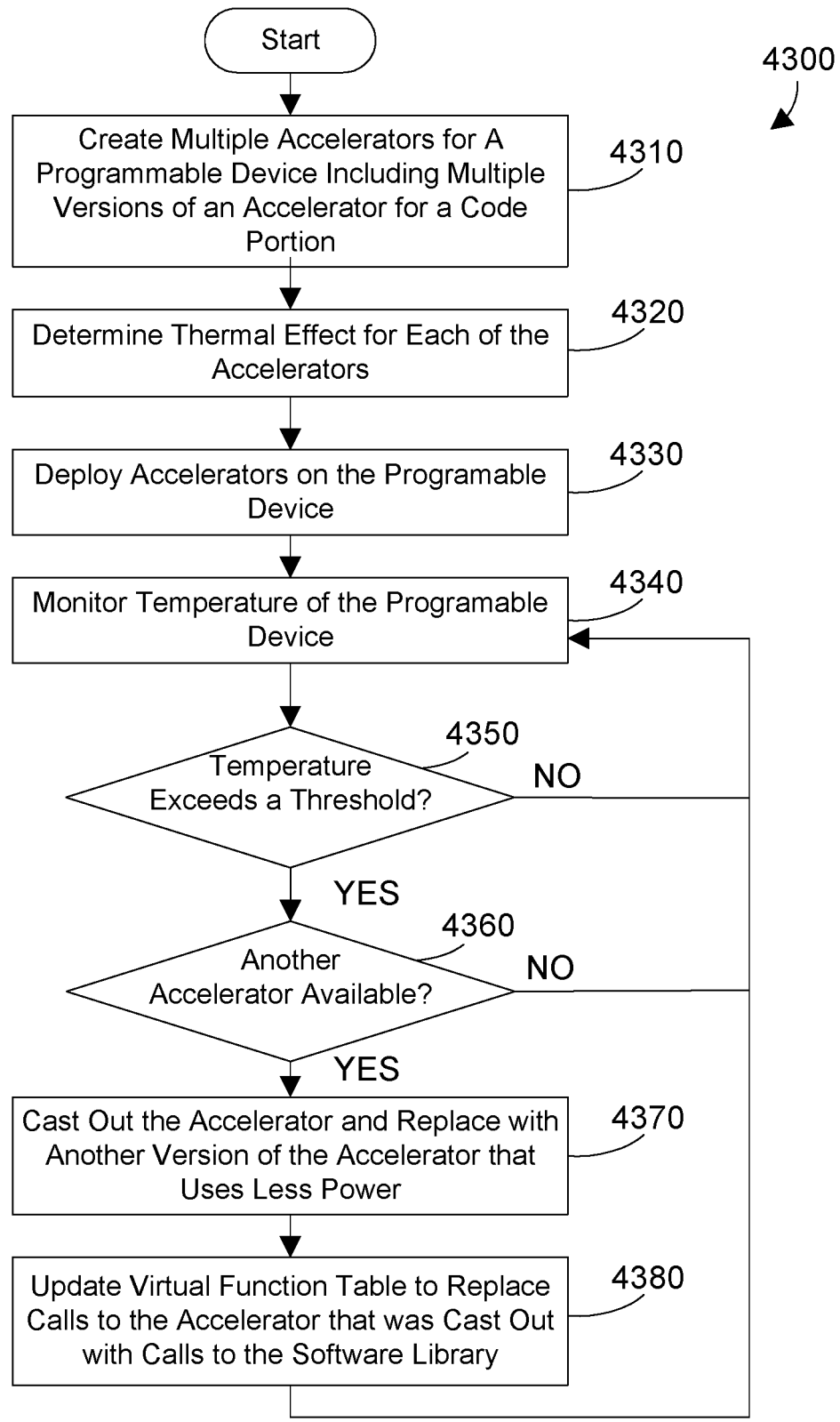
FIG. 43 is a flow diagram of another method for the thermal manager to manage accelerators in a programmable device.

FIG. 43 is a flow diagram of another method 4300 for the thermal manager to manage accelerators in a programmable device. The steps of method 4300 are preferably performed by the thermal manager 3640 and/or the accelerator manager 331. Multiple accelerators are created for a programmable device including multiple versions of an accelerator for a given function or code portion (step 4310). A thermal effect or power score for each of the accelerators is determined (step 4320). Accelerators are deployed on the programmable device (step 4330). The thermal manager then monitors the temperature of the programmable device (step 4340) to determine when the temperature exceeds a threshold (step 4350). When the temperature does not exceed the threshold (step 4350=no) then return to step 4340. When the temperature does exceed the threshold (step 4350=yes) then the thermal manager determines if there is another accelerator available for the same function or code portion (step 4360). If there is another accelerator available that uses less power, then the thermal manager casts out the accelerator and replaces it with another version of the accelerator that uses less power (step 4370) The virtual function table is then updated to replace calls to the accelerator that was cast out with calls to the software library (step 4380). The method continues by returning to continually monitor the temperature of the programmable device (step 4340).

A thermal manager manages programmable devices that include one or more accelerators. The thermal manager may be part of an accelerator manager that manages multiple accelerators in multiple programmable devices. The thermal manager monitors the temperature of a programmable device and casts out one or more accelerators when the temperature of the programmable device exceeds a threshold. Where there are multiple accelerator images that have different thermal effects for a given function the thermal manager may replace the cast out accelerator with another accelerator image for the same function that uses less power.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

The invention claimed is:

1. An apparatus comprising:
   at least one processor;
   a memory coupled to the at least one processor;
   a plurality of accelerators in a programmable device coupled to the at least one processor;
   a thermal manager residing in the memory and coupled to the at least one processor, the thermal manager monitoring temperature of the programmable device, and when the temperature is above a threshold the thermal manager casts out a first accelerator of the plurality of accelerators by removing programming for the first accelerator from the programmable device to reduce power consumption of the programmable device.

2. The apparatus of claim 1 further comprising:
   a software library residing in the memory that includes a plurality of functions called by the at least one computer program;
   a virtual function table that includes a plurality of calls to the software library in the at least one computer program and further includes a plurality of calls to the plurality of accelerators;
   wherein the accelerator manager, after casting out the first accelerator from its corresponding programmable device, updates the virtual function table to replace a call to the first accelerator that was cast out with a call to the software library.

3. The apparatus of claim 1 further comprising multiple accelerator images residing in the memory that provide the same function and where the thermal manager selects one of the multiple accelerators images to deploy to one of the programmable devices based on power consumption of the accelerator images.

4. The apparatus of claim 3 wherein the thermal manager determines a second accelerator image that provides a same function as the first accelerator using less power, and deploys with the second accelerator image to the programmable device.

5. The apparatus of claim 4 wherein multiple accelerators that provide the same function are created by providing an input parameter into a synthesis function that created the second accelerator image.

6. The apparatus of claim 5 wherein the input parameter instructs the synthesis function to maximize speed of the second accelerator image.

7. The apparatus of claim 5 wherein the input parameter instructs the synthesis function to minimize area of the second accelerator image to reduce the power.

8. The apparatus of claim 1 wherein each of the plurality of programmable devices comprises an Open Coherent Accelerator Processor Interface (OpenCAPI) coupled to the at least one processor.

9. The apparatus of claim 1 wherein each of the plurality of programmable devices comprises a field-programmable gate array (FPGA).

10. An apparatus comprising:
    at least one processor;
    a memory coupled to the at least one processor;
    a first field-programmable gate array (FPGA) coupled to the at least one processor that comprises a first Open Coherent Accelerator Processor Interface (OpenCAPI)

coupled to the at least one processor, wherein the first FPGA includes a plurality of accelerators;
a thermal manager residing in the memory and coupled to the at least one processor, the thermal manager monitoring an on-chip temperature of the FPGA, and when the temperature is above a threshold the thermal manager casts out a first accelerator of the plurality of accelerators by removing the first accelerator from the FPGA to reduce power consumption of the FPGA;
wherein the thermal manager determines a second accelerator image that provides a same function as the first accelerator using less power, and deploys the second accelerator image to the FPGA to replace the cast out first accelerator removed from the FPGA; and
wherein an image for the first accelerator and the second accelerator image that provide the same function are created by providing an input parameter into a synthesis function that created the image for the first accelerator and second accelerator image.

11. The apparatus of claim 10 wherein the input parameter instructs the synthesis function to minimize area of the second accelerator image to reduce the power.

12. A method for managing accelerators, the method comprising:
creating multiple accelerators images for a programmable device;
determining a thermal effect for each of the plurality of accelerators images;
deploying the plurality of accelerator images to a programmable device to generate a plurality of accelerators;
monitoring a temperature of the programmable device; and
when the temperature of the programmable device exceeds a threshold, casting out a first accelerator of the plurality of accelerators by removing programming for the first accelerator from the programmable device.

13. The method of claim 12 further comprising:
creating a software library that includes a plurality of functions called by a computer program;
a virtual function table that includes a plurality of calls to the software library in the computer program and further includes a plurality of calls to the plurality of accelerators;
after casting out the first accelerator from the programmable device, updating the virtual function table to replace a call to the first accelerator that was cast out with a call to the software library.

14. The method of claim 12 further comprising creating multiple accelerator images for the programmable device that provide a same function.

15. The method of claim 14 further comprising determining a second accelerator image is available that provides a same function as the first accelerator using less power, and deploys the second accelerator to the programmable device.

16. The method of claim 15 wherein the multiple accelerator images that provide the same function are created by providing an input parameter into a synthesis function that created the second accelerator image.

17. The method of claim 16 wherein the input parameter instructs the synthesis function to maximize a speed of the second accelerator image.

18. The method of claim 16 wherein the input parameter instructs the synthesis function to minimize an area of the second accelerator image to reduce the power.

19. The method of claim 12 wherein each of the plurality of programmable devices comprises an Open Coherent Accelerator Processor Interface (OpenCAPI) coupled to the at least one processor.

20. The method of claim 12 wherein each of the plurality of programmable devices comprises a field-programmable gate array (FPGA).

* * * * *